(12) United States Patent
Williams, Jr.

(10) Patent No.: US 12,493,800 B2
(45) Date of Patent: Dec. 9, 2025

(54) SYSTEMS AND METHODS FOR DYNAMICAL SYSTEM STATE AND PARAMETER ESTIMATION

(71) Applicant: STRATOS PERCEPTION, LLC, Houston, TX (US)

(72) Inventor: Rube Ben Williams, Jr., Houston, TX (US)

(73) Assignee: Stratos Perception, LLC, Houston, TX (US)

( * ) Notice: Subject to any disclaimer, the term of this patent is extended or adjusted under 35 U.S.C. 154(b) by 0 days.

(21) Appl. No.: 18/988,558

(22) Filed: Dec. 19, 2024

(65) Prior Publication Data

US 2025/0124304 A1    Apr. 17, 2025

Related U.S. Application Data

(63) Continuation of application No. PCT/US2024/022643, filed on Apr. 2, 2024.
(Continued)

(51) Int. Cl.
G06N 3/0985  (2023.01)
G06N 3/044   (2023.01)

(52) U.S. Cl.
CPC ........... G06N 3/0985 (2023.01); G06N 3/044 (2023.01)

(58) Field of Classification Search
CPC .... G05B 17/02; G05B 13/048; G05B 19/042; G05B 19/41865; G05B 19/41875; G05B 23/0221; G05B 23/0286; G05B 23/0294; G05B 13/027; G05B 13/028; G05B 13/04; G05B 13/042; G05B 15/02; G05B 19/4093; G05B 19/4183; G05B 19/4184;
(Continued)

(56) References Cited

U.S. PATENT DOCUMENTS 7,574,333 B2 *  8/2009  Lu ........................... G05B 17/02
                                                    702/56
10,969,752 B1 *  4/2021  Brink ................... G05B 13/048
(Continued)

OTHER PUBLICATIONS

International Search Report and Written Opinion for PCT/US2024/022643, dated Jul. 17, 2024, 9 pages.

*Primary Examiner* — Mohammad K Islam
(74) *Attorney, Agent, or Firm* — Haynes and Boone, LLP

(57) ABSTRACT

The embodiments are directed to an inferential sensing system, methods and computer program product of an estimator for estimating parameters of complex nonlinear time-varying systems from scarce system output measurements. The estimator comprises a two-step process to accurately estimate the time-varying parameters of the time-varying system based on the input and output sample of the time-varying system. First, multiple filters in the high frequency processing loop, operating independently and concurrently process the input and output samples of the time-varying system to generate a hypersurface comprising time series objects. Each filter is restricted to adapt only a subset of the modeled time-varying parameters. The hypersurface comprising the time series objects is aggregated over several iterations of the high frequency processing loop. Second, the hypersurface is passed through a neural network in the low frequency processing loop to infer estimates of the time-varying system parameters.

21 Claims, 19 Drawing Sheets

Related U.S. Application Data

(60) Provisional application No. 63/627,066, filed on Jan. 31, 2024, provisional application No. 63/456,527, filed on Apr. 2, 2023.

(58) Field of Classification Search
CPC .......... G05B 19/41845; G05B 19/4185; G05B 19/41855; G05B 2219/31265; G05B 2219/31337; G05B 2219/31435; G05B 2219/31457; G05B 2219/32129; G05B 2219/32194; G05B 2219/32196; G05B 2219/32201; G05B 2219/32287; G05B 2219/32404; G05B 2219/33209; G05B 2219/35001; G05B 2219/35095; G05B 2219/37337; G05B 2219/37351; G05B 2219/37434; G05B 2219/37537; G05B 2219/40115; G05B 2219/45004; G05B 2219/45129; G05B 23/02; G05B 23/0205; G05B 23/0208; G05B 23/0229; G05B 23/0235; G05B 23/024; G05B 23/0243; G05B 23/0254; G05B 23/0264; G05B 23/0283; G05B 23/0289; G05B 23/0291; G05B 23/0297; G05B 19/4155; G05B 13/045; G05B 2219/41146; G05B 2219/42061; G05B 19/19; G05B 2219/42058; G06N 3/0985; G06N 3/044
See application file for complete search history.

(56) References Cited

U.S. PATENT DOCUMENTS

| | | | |
|---|---|---|---|
| 2004/0123600 A1* | 7/2004 | Brunell | G05B 13/042 60/773 |
| 2006/0074558 A1* | 4/2006 | Williamson | G01S 19/15 342/357.56 |
| 2008/0235166 A1* | 9/2008 | Sayyar-Rodsari | G05B 13/048 706/12 |
| 2019/0129405 A1 | 5/2019 | Cella et al. | |
| 2024/0160831 A1* | 5/2024 | Ikeda | G06F 40/109 |

* cited by examiner

SYSTEMS AND METHODS FOR DYNAMICAL SYSTEM STATE AND PARAMETER ESTIMATION

CROSS-REFERENCE TO RELATED APPLICATIONS

This application is a continuation of International Application No. PCT/US2024/022643 filed Apr. 2, 2024, which claims priority under 35 U.S.C. § 119 to U.S. Provisional Application No. 63/456,527, filed Apr. 2, 2023, and U.S. Provisional Application No. 63/627,066, filed Jan. 31, 2024, each of which is hereby incorporated by reference herein in its entirety.

TECHNICAL FIELD

This disclosure relates generally to inferential sensing applied to the input-output behavior of a time-varying system to inform control systems, anomaly detection systems, and decision systems of the behaviors of the parameters and states of a time-varying system. In particular, this disclosure relates to using neural network based adaptive inferential sensing to provide control, detection, and decision systems real-time estimates of parameter and state behaviors that govern a nonlinear time-varying system.

BACKGROUND

Traditional inferential sensing (i.e., adaptive estimation) methods are used in adaptive control systems. Traditional inferential sensing is applied to system inputs and outputs to estimate system time-varying parameters, along with state behaviors, that are not directly sensed, and to provide such information to control systems for updating their incorporated implicit or explicit reference models of the system. Such time-varying system parameters may be physical features that define or govern the system's behavior, but may also, for the purposes of inferential sensors (i.e., adaptive estimators), include system operating regimes, system disturbances originating from the environment, unknown control inputs, stochastics, and time.

Conventional inferential sensors (e.g., Kalman Filter variants) offer generalized state and parameter estimation support for time-varying systems that can be represented by a set of linearizable state-space equations with only a few independent time-varying parameters, generally less than or equal in number to the number of independent measured system outputs or equations in the state-space. However, time-varying systems that are severely nonlinear and that have a high number of potentially time-varying parameters, causing the estimation problem to the underconstrained, are traditionally supported by specialized ad hoc methods that can provide limited scope adaptive control solutions. Further, increasingly the physics of modern complex operational systems are represented using computational models (e.g., computational fluid dynamics). These representations do not have conventional state-space representations nor the required accurate reduced-order models to provide even limited scope parameter estimation for adaptive control objectives. Also, the lack of generalized parameter estimation methods applicable to highly nonlinear time-varying systems, and concerning underconstrained estimation applications, limits the feasibility of inferential sensing in large classes of estimation problems concerning machine and robot autonomy, such as autonomous navigation, rendezvous, docking, and collision avoidance by spacecraft.

Consequently, there is a need for a broadly applicable inferential sensing method that can estimate the time-varying parameters of complex nonlinear time-varying systems as required for the effective operation and performance of the control systems of such time-varying systems.

SUMMARY

The non-limiting embodiments are directed to novel state and parameter filtering using a two-step process to accurately estimate the time-varying parameters of an underconstrained nonlinear dynamical time-varying system based on the input-output behaviors of such system.

In a first step, the process utilizes a filter (described below), but operates it in its Failure Mode 2 (See Table 1) while incorporating the filter into a multiple concurrent filter methodology, comprising P such filters, where P is the number of time-varying system parameters. The process utilizes each filter to independently and concurrently process identical input-output observations from the target system. However, the $i^{th}$ filter is assigned to adapt only a subset, p, of the available parameters, including only the $i^{th}$ parameter, of $\hat{q}_i$, the parameter vector for the $i^{th}$ filter. The $i^{th}$ filter attempts to minimize its output prediction errors while adapting the subset, p, holding all other modeled parameters in $\hat{q}_i$ constant. Since the time-varying system input-output sample is responsive to P>p time-varying system parameters, each filter (by adapting only p local parameter estimates) operates in Failure Mode 2, generating outputs that are generally nonsensical relative to the system physics. However, the signals generated by each filter comprise a component of a larger aggregate hypersurface that is relatively indicative of the time-varying system parameters values corresponding to the associated input-output sample.

In the second step, the hypersurface component outputs of the filter bank are aggregated to produce a hypersurface that corresponds to the system time-varying parameter errors associated with the input-output sample. To ensure the uniqueness and predictive capability of the hypersurface, each filter can be performed for several iterations on the input-output sample to generate a series of outputs that are also aggregated into the hypersurface. Further, to improve predictive capability, hypersurfaces generated over several past time-steps (i.e., over a sequence of past input-output samples) can be concatenated into a final hypersurface. The hypersurface is then utilized by an auxiliary neural network to infer accurate estimates of the associated time-varying system parameters. As a result of this two-step operation, the number of parameters that can be estimated may be unlimited and have no limiting relationship to the number of system outputs. The unlimited parameter estimation provides novel performance opportunities and novel operational objectives concerning highly nonlinear time-varying systems, including applications in failure management, autonomy for systems that interact with a time-varying environment, and supervision of strong artificial intelligence.

In the case of failure management, systems and methods described herein enable a system to perform arbitrarily comprehensive fault detection and fault-tolerant control by estimating a comprehensive scope of potentially time-varying parameters that define a system of interest, regardless of expectations of degradation or failure. This approach can substantially eliminate impactful surprises and associated risks, facilitate real-time system and subsystem level decision (e.g., diagnoses and prognoses) and nuance control responses to degradations and failures. Further, such systems and methods may encourage a systemized and repeatable failure management approach that can be generalized, controlled, and edited across systems, missions, and mission lifecycles, an elusive failure management capability that is highly desired by modern engineering organizations, including within National Aeronautics and Space Administration (NASA). Applications for failure detection and management include essentially all complex systems, and systems of systems, that experience deviations and failures, including physical structures, machines, pipelines, engines, turbomechanical systems, biological systems, electromagnetic systems, mechanical systems, fluid systems, chemical systems, nuclear energy systems, artificial intelligent systems, and others.

An example of the benefits to advanced autonomy includes spacecraft autonomous rendezvous, docking, and collision avoidance. In such case, the high number of time-varying parameters that define the governing orbital mechanics solutions can include gravitational field behaviors; trajectories of external objects; intrinsic and external spacecraft motion, position, and acceleration; and spacecraft propulsion performance. Generally, appropriate orbital mechanics solutions and trajectory design is accomplished by ground control on Earth and performed by spacecraft in deliberate phases that include significant periods of waiting. However, the systems and methods described herein may facilitate continuous real-time ad hoc generation of spacecraft autonomous control behaviors, including propulsion responses, corresponding to estimated governing orbital mechanics, that achieve desired spacecraft motion, position, and propellant conservation objectives. Other applications include autonomous transportation systems in general (e.g., aircraft, cars, boats), tracking systems (e.g., for power beaming, line-of-sight communications), robot services (i.e., construction, remediation, surgery), and others.

Concerning the supervision of strong artificial intelligence, the systems and methods described herein generally enable the dynamic specification of appropriate weak or strong artificial intelligence system parameters at scale in response to a scarce set of stochastic and dynamic observations. Superintelligence (i.e., strong artificial intelligence that substantially exceeds human intelligence and therefore human ability to anticipate, surmise, and control) is projected to be achieved within about a decade. Superalignment (i.e., weaker artificial intelligence supervising artificial superintelligence) is considered vital for human safety. However, how superalignment may be implemented is presently unknown. Related artificial intelligent systems, in the form of large language models, are the likely predecessors of artificial superintelligence, and these models can comprise several billion parameters. Further, the time-varying parameter-space that defines the behaviors of such models may include millions of external information disturbances as well as millions of embedded and other dynamical information patterns originating within and external to the core artificial superintelligence. The systems and methods described herein may allow for the rapid management of such parameters at scale into safer configurations in response to relatively scarce system output behaviors that may be indicative of relative threats and adverse impacts to human safety.

Figure 1:
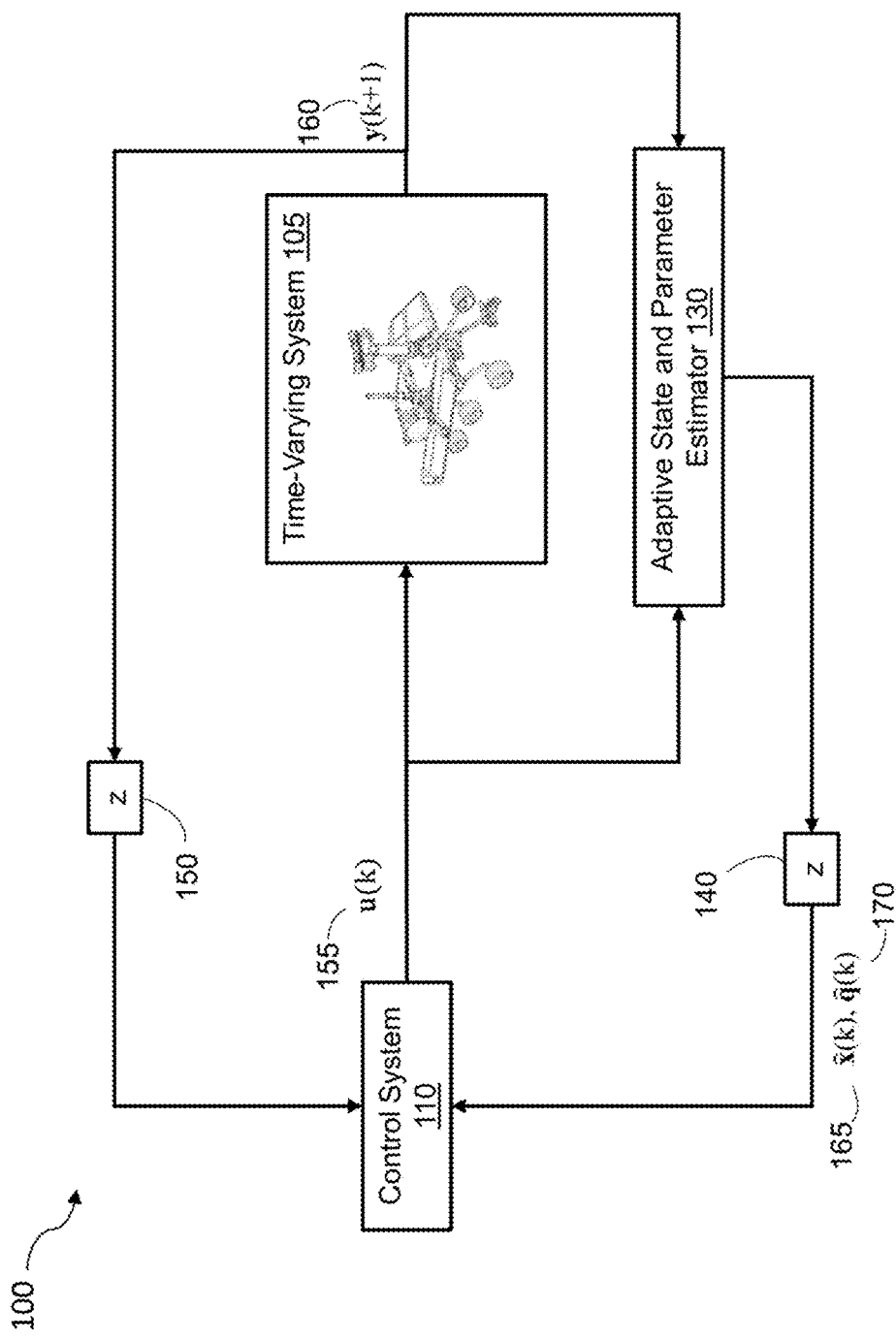
FIG. 1 is a block diagram of a failure management system for a time-varying system, according to various aspects of the disclosure.

Aspects of the disclosure and their advantages are best understood by referring to the detailed description that follows. It should be appreciated that like reference numerals are used to identify like elements illustrated in one or more of the figures, wherein showings therein are for purposes of illustrating aspects of the present disclosure and not for purposes of limiting the same.

DETAILED DESCRIPTION

It is to be understood that the following disclosure provides many different aspects, or examples, for implementing different features of the disclosure. Specific examples of components and arrangements are described below to simplify the disclosure. These are, of course, merely examples and are not intended to be limiting. Various features may be arbitrarily drawn in different scales for simplicity and clarity.

Some embodiments incorporate a filter, described be the following equations (i-iii).

$$\hat{x}(k+1 \mid k) = f_{RNN}(\hat{x}(k \mid k), \hat{q}(k \mid k), u(k)) \quad \text{(i)}$$

$$\hat{y}(k+1 \mid k) = h_{NN}(\hat{x}(k+1 \mid k))$$

$$\hat{q}(k \mid k+1) = \hat{q}(k \mid k) + R_q(k+1)J_q(k+1) \quad \text{(ii)}$$

$$\hat{x}(k+1 \mid k+1) = f_{RNN}(\hat{x}(k+1 \mid k), \hat{q}(k \mid k+1), u(k)) \quad \text{(iii)}$$

$$\hat{q}(k+1 \mid k+1) = \hat{q}(k \mid k+1)$$

Equations i-iii describe a process for estimating states and parameters of a nonlinear system, where, function the $f_{RNN}($ $)$ is a recurrent neural network model of the nonlinear system of interest, $\hat{x}$, is a vector of the estimated states of the system, $\hat{q}$, is a vector of the estimated parameters of the system, $\hat{y}$, is a vector of the estimated outputs of the system, u, is a vector of the inputs to the system, J, is a vector of the gradients from the derivative of $f_{RNN}($ $)$ with respect to $\hat{q}$, and R, is a covariance matrix of the elements of J, computed and related to signal to noise ratios.

Where y, is a vector of independent system outputs, this filter assumes that there a nonlinear system, (iv)

$$y(k+1) = Sys(x(k), q(k), u(k)), \quad \text{(iv)}$$

that is sufficiently accurately modeled by $f_{RNN}($ $)$ when the system parameters equal the estimated parameters, i.e., Equation (v), $$\hat{q}(k \mid k+1) = q(k). \quad \text{(v)}$$

This assumption also implies that, for $\hat{q}$ of size N (where N is positive integer) and q of size P (where P is a positive integer), then $$N = P, \quad \text{(vi)}$$

and each element of q, has a corresponding approximating element in $\hat{q}$. Additionally, for the system output vector, y, of size M (where M is a positive integer), the filter (i-iii) is only convergent for $$N \leq M. \quad \text{(vii)}$$

The filter (i-iii), therefore has two main independent failure modes, describe in Table I, below:

TABLE I

| Failure Mode | Failure Condition | Failure Result |
|---|---|---|
| 1 | N > M | The filter diverges |
| 2 | N < P, or q, otherwise, does not have a corresponding approximating element in $\hat{q}$ | The filter may produce nonsensical outputs |

The disclosure pertains to a systems and methods for estimating dynamic states and parameters in a time-varying system applied to inform a control system or a decision system (e.g., an artificial intelligence system) to enhance its ability to adapt to time-varying systems and domains. The method for estimating states and parameters is accomplished, at least in part, using machine learning, including machine learning models and neural networks. Machine learning pertains to a paradigm for determining an embedding function based on a dataset that includes an input and a corresponding output and is trained on the input to generate a corresponding output.

This disclosure further relates to estimating numerous system parameters in a time-varying complex dynamical system and providing such estimates to a control system or a decision system to enhance its ability to adapt or control the time-varying system. The embodiments may estimate the dynamical system parameters in different scenarios, including when the available measured system outputs are scarce. The embodiments implicitly expand the dimension of the scarce system outputs to satisfy the general solution requirement of having a sufficient number of independent output behaviors to match the number of independent system parameters that require estimation. Therefore, the embodiments provide a capability to estimate an unlimited number of independent time-varying system parameters, independent of the number of contributing system outputs. In other words, for a vector of system time-varying parameters, $q(\bullet)$, where $q(\bullet)$ has size $P \geq 1$, and a vector of measured independent system outputs, $y(\bullet)$, where $y(\bullet)$ has size $M \geq 1$, the embodiments provide an accurate estimate of the system parameters, $\hat{q}(\bullet)$, of size N=P, independent of the number of system outputs, M, including when N=P>>M.

The figures of the disclosure include certain notations that are often used in the description of the flow of discrete-time control and estimation systems, but that are not usually present when describing continuous time systems. Particularly, the notions include three types corresponding to indications of relative time, relative delay, and estimation dependency(with respect to time). Relative time is indicated by, for example, k+1, k, k−1, etc. For an information sequence, {y($\bullet$)}, then y(k+1) is preceded in time by y(k), which is preceded in time by y(k−1). For delay notation, the symbol $z^{-n}$ is used for some integer n. Relative delay notation is used to explicitly indicate recursion in the flow diagram and the relative timing of such signals due to recursion. The symbol, $z^{-n}$, effects the relative time of a signal, such that a signal, y(k), entering a block with the notation, $z^{-n}$, then exits the block with its notation updated to y(k−n).

For example, for a simple, i.e., immediate, feedback loop, n=1, which may be shown as $z^{-1}$ or simply, z. For feedback loops that have different frequencies, period of the simple feedback (or 1 unit delay) for a lower frequency loop is normalized to the period of the higher frequency loop, and is shown as $z^{-n}$, where n is the number of feedback cycles (i.e., periods) that the higher frequency loop performs to correspond to a single feedback cycle of the lower frequency loop.

Estimation dependency is expressed for estimate, $\hat{y}(\bullet)$ by providing a second timing notation after a "|" symbol. For example, $\hat{y}(k+1|k)$ indicates that the estimate corresponds to relative time k+1 and was computed, at least in part, from information obtained at time k. This type of notation may be used to observe the timing of the estimation dependencies, since these indicate certain definitions pertinent in estimation theory, namely prediction, filtering, and smoothing. A prediction is indicated by $\hat{y}(k+1|k)$, since the estimate at time k+1 is dependent on past information at time k. A filtered estimate is indicated by $\hat{y}(k|k)$, since the estimate at time k is dependent on information obtained at time k. A smoothed estimate is indicated by $\hat{y}(k-1|k)$, since the estimate at time k-1 is dependent on future information at time k.

FIG. 1 is a block diagram 100 of an environment where an adaptive state and parameter system may be implemented, according to aspects of the disclosure. FIG. 1 illustrates an environment 100. The environment 100 includes a time-varying system 105, control system 110, and adaptive state and parameter estimator 130, all of which may be implemented in hardware, software, or a combination thereof. The adaptive state and parameter estimator 130 includes sufficient mechanical and electronic capability for information reception, transmission, and transformation to support the interaction with the rest of the environment 100. The adaptive state and parameter estimator 130 may estimate certain parameters and states of a time-varying system 105 and informs the control system 110 of the correct parameters and states from which to base its control responses to achieve its objectives. In a non-limiting embodiment, the time-varying system 105 may be a stochastic nonlinear dynamical system, such as a space propulsion system, an outer space environment (comprising stars, planets. spacecraft, and gravitational fields), an external collision threat, an artificial intelligence, a quantum computer, an autonomous vehicle, or a populous urban environment. In a non-limiting embodiment, the control system 110 may be a control system, a detection system, an anomaly detection or a decision system of the time-varying system 105. In some non-limiting embodiments, "control system" may include traditional control systems and adaptive control and reconfiguration systems (including but not limited to electronic, electromagnetic, and mechanical realizations), as well as decision systems (e.gs., including but not limited to expert systems, artificial intelligence), logs, monitors (e.g., including but not limited to human readable displays), communications systems (e.g., including but not limited to audio, visual, kinesthetic, and chemical alarms and indicators), humans (e.g., via various forms of feedback, including but not limited to audio, sound, kinesthetic, and bio-feedback).

The environment 100 also includes signal transformation blocks 140 and 150. Though depicted outside of the time-varying system 105, control system 110, and adaptive state and parameter estimator 130, the signal transformation blocks 140 and 150 may be incorporated into the time-varying system 105, control system 110, and adaptive state and parameter estimator 130. Further, the embodiments are not limited to signal transformation blocks 140, 150 as any number of signal transformation blocks may be included to realize the connectivity and interactions of the environment 100. In some embodiments, adaptive state and parameter estimator 130 may be combined with, or into, the control system 110.

The time-varying system 105 may be a system that experiences degradations and failures. For example, loss of pressure or unwanted vibrations in a mechanical system such as an engine. The time-varying system 105 may receive known inputs, shown as system input $u(\bullet)$ 155, and outputs, shown as system output $y(\bullet)$ 160. The system input 155 and output 160 may be vector functions of a discrete time variable, which may correspond to the ticks of a clock as implemented in software or hardware. When no variable appears in the argument of a function, i.e., the use of a single period, the function is being referred to generally for any time step, as opposed to a particular time step, which is designated using a parameter, such as k. Unless stated otherwise, when k appears in the argument of a function it indicates the function at the k-th time step, which may be designated in milliseconds, seconds, minutes, and the like. Consequently, k+1 in the argument of a function means the function at the next time step after the k-th time step. The system input $u(\bullet)$ 155 may include instructions or objectives for the time-varying system 105 to meet by manipulating the degrees of freedom available to time-varying system 105. The system output $y(\bullet)$ 160 may correspond to sensor readings associated with the time-varying system 105, such as power consumption, temperature, heading, location, altitude, velocity, etc. The system output, $y(\bullet)$ 160 may be acquired by the adaptive state and parameter estimator 130 by any sensory means, including radar, camera (e.g., machine vision), thermocouple, accelerometer, microphone, etc. The time-varying system 105 may also have unknown (e.g., unmeasured) system states $x(\bullet)$ and unknown system parameters $q(\bullet)$. An example of system states $x(\bullet)$ may be a power consumption or temperature of certain system components. The unknown system parameters $q(\bullet)$ may reflect degradations in the time-varying system 105, e.g., fluid leaks in a fuel delivery subsystem, internal mechanical vibrations, stresses, and frictions, and may also reflect time, ideas, abstractions, disturbances, unaccounted for control inputs, and other information that can be quantified and associated with the time-varying system behaviors. Vectors $\hat{x}(\bullet)$ 165 and $\hat{q}(\bullet)$ 170 may be an accurate system state estimate and system parameter estimate, respectively, that are generated by adaptive state and parameter estimator 130. Vectors $\hat{x}(\bullet)$ 165 and $\hat{q}(\bullet)$ 170 may be provided to the target system and/or associated control system, such as control system 110, after passing through signal transformation block 140.

The control system 110 may provide instructions and/or information in system input $u(\bullet)$ 155 to the time-varying system 105. The instructions and/or information may be based on received system output $y(\bullet)$ 160 from the time-varying system 105, and system state estimate $\hat{x}(\bullet)$ 165 and system parameters estimate $\hat{q}(\bullet)$ 170 from the adaptive state and parameter estimator 130. In some aspects, the control system 110 may be physically and/or communicatively connected to the time-varying system 105, e.g., a wired connection and/or forms of physical fastening. In other aspects, the control system 110 may be communicatively connected to the time-varying system 105 via, for example, Bluetooth or Wi-Fi, or other devices and connections.

The adaptive state and parameter estimator 130 may receive the system input $u(\bullet)$ 155 and system output $y(\bullet)$ 160 from time-varying system 105. The adaptive state and parameter estimator 130 may generate system state estimate $\hat{x}(\bullet)$ and system parameters estimate $\hat{q}(\bullet)$ of the time-varying system 105. System state estimate $\hat{x}(\bullet)$ and system parameters estimate $\hat{q}(\bullet)$ may pass through signal transformation block 140 to become delayed system state estimate $\hat{x}(\bullet)$ 165 and delayed system parameters estimate $\hat{q}(\bullet)$ 170.

Figure 2:
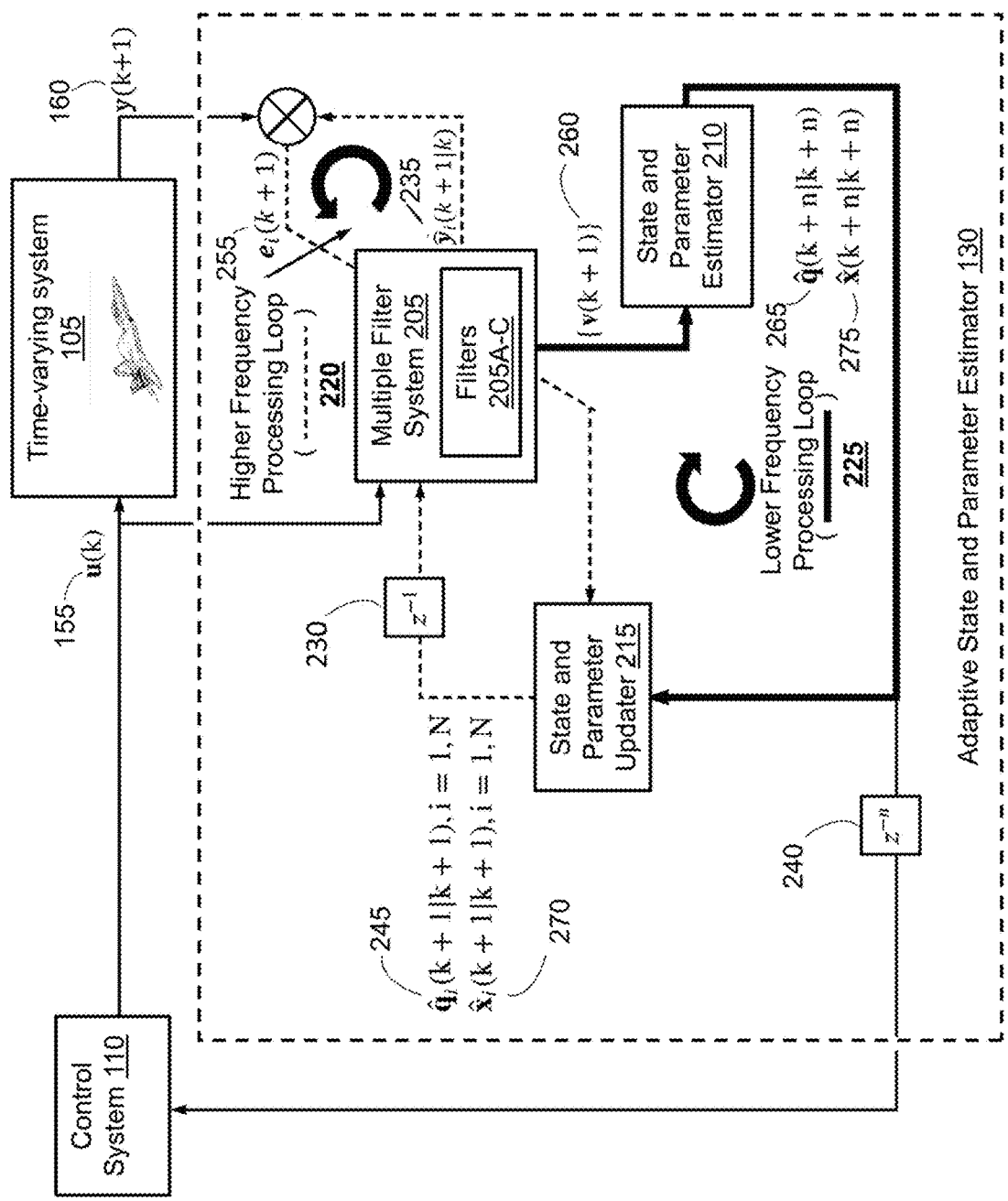
FIG. 2 is a block diagram of an adaptive state and parameter estimator, according to various aspects of the disclosure.

FIG. 2 is a block diagram 200 of an adaptive state parameter estimator, according to some aspects of the disclosure. An adaptive state and parameter estimator 130 includes a multiple filter system 205, a state and parameter estimator 210, and a state and parameter updater 215. The multiple filter system 205, state and parameter estimator 210, and state and parameter updater 215 may be included in two processing loops, a higher frequency inner loop (HFIL) 220 and a lower frequency outer loop (LFOL) 225, also referred to as a higher frequency processing loop and a lower frequency processing loop, respectively. The HFIL 220 and the LFOL 225 may work together to estimate the parameters and states of time-varying system 105. The multiple filter system 205 includes multiple filters 205A-C in a non-limiting embodiment. Filters 205A-C are further described in detail in FIG. 3, below. The HFIL 220 uses the multiple filter system 205 to create information-rich hypersurfaces. The LFOL 225 estimates the accurate parameter estimates based on these hypersurfaces. The hypersurfaces are high dimensional surfaces that may encode the behavior of a system, e.g., time-varying system 105, including behavior that may depend on unknown system states $x(\bullet)$ or unknown system parameter estimation errors, $q(\bullet)-\hat{q}(\bullet)$. Both processing loops operate continuously to perform the parameter and state estimates in real-time.

Figure 3:
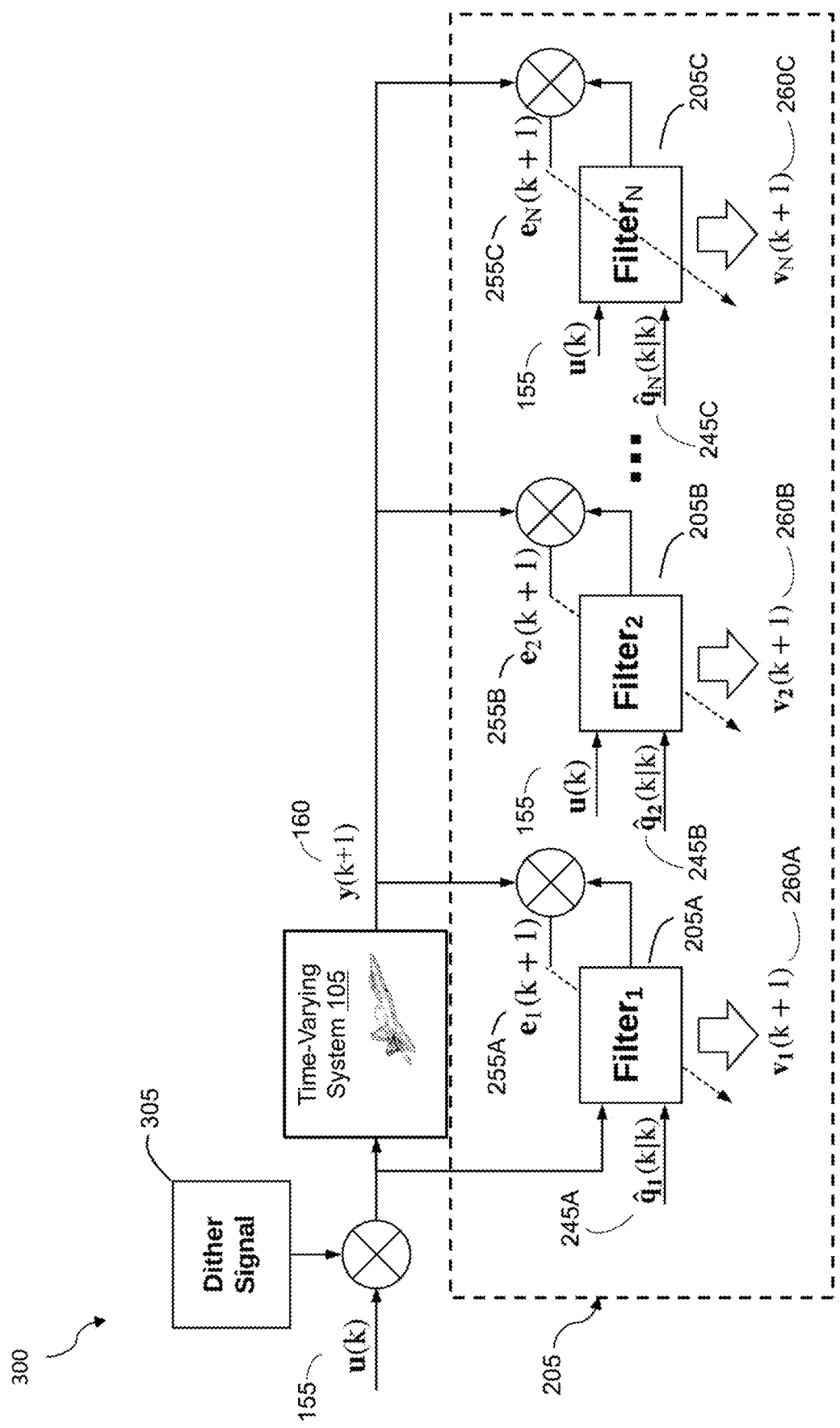
FIG. 3 is a block diagram of a filtering process, according to various aspects of the disclosure.
Figure 4:
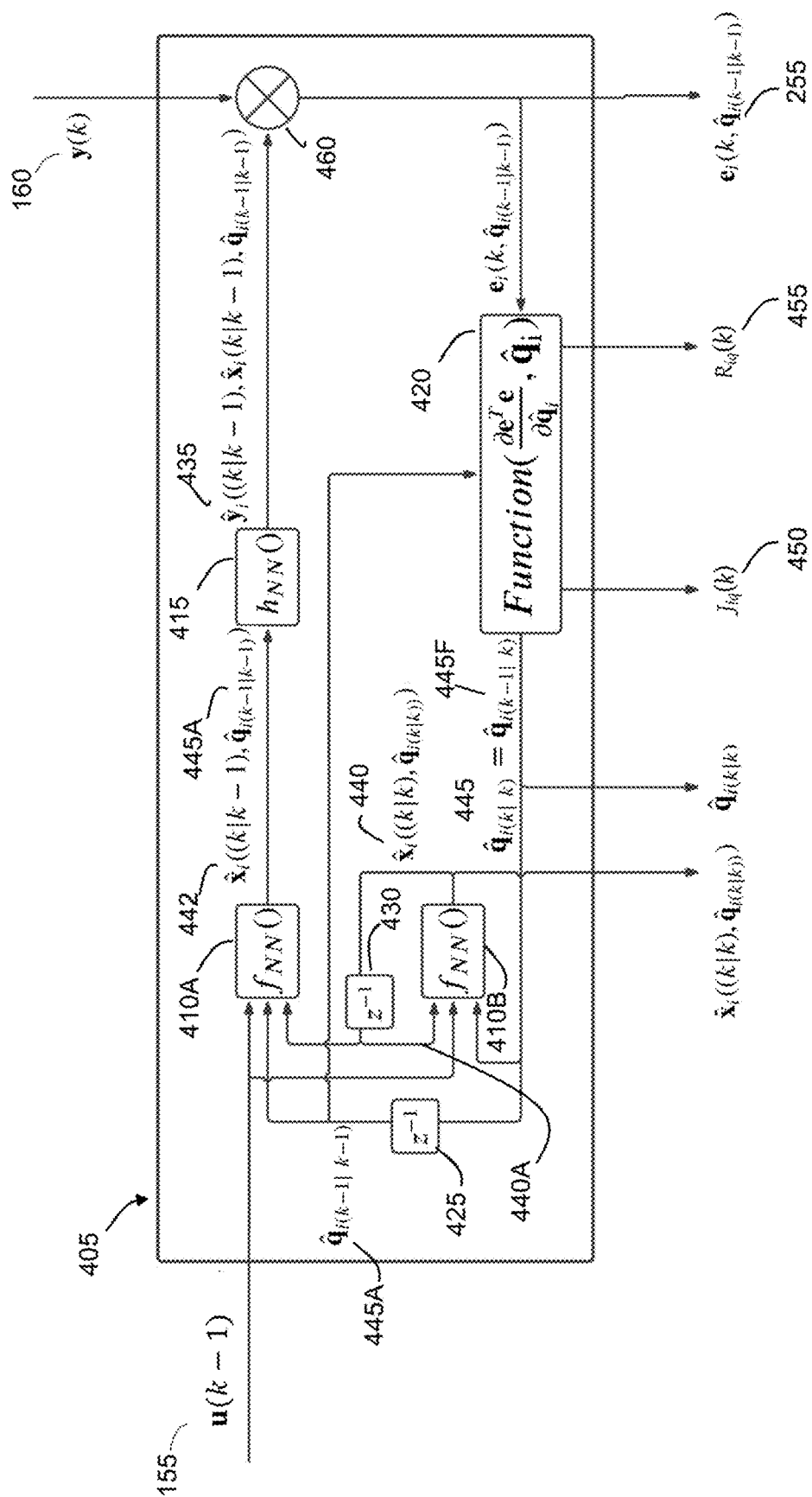
FIG. 4 is a schematic diagram of a filter, according to various aspects of the disclosure.

The HFIL 220 may perform operations at, or higher than, the sampling frequency of the control system 110 of the target system, such as time-varying system 105. The multiple filters 205A-C of the multiple filter system 205 concurrently process the system output $y(\bullet)$ 160 and system input $u(\bullet)$ 155 of time-varying system 105. For each filter 205A-C in the multiple filter system 205, HFIL 220 collects the sequences of prediction errors and corresponding estimated system parameters, and other corresponding data, into a moving-window object of width w>n, where n is the operating period of the LFOL 225 which in some embodiments is greater than or equal to the sampling period of the control system. In some aspects, the collection of sequences provides a hypersurface that may be used for inferring the accurate parameter estimates at time step k+n. For example, suppose HFIL frequency $f_{HFIL}$ is normalized such that $f_{HFIL}=1$. In this case, the fundamental time step that may be used by the embodiments are unity. Thus, the filtered estimates and aggregations, as described with respect to and depicted in FIGS. 3-5, are performed by the HFIL 220 at time steps, k=1, 2, 3, and so on.

Although FIG. 2 illustrates filters 205A-C, multiple filter system 205 may include a variable number of filters, such as N filters, where N is an integer. Multiple filter system 205 may receive filtered estimated system parameters $\hat{q}_i(\bullet)$ 245 from state and parameter updater 215. In some embodiments, the number of filters, N, used in the multiple filter system 205 may be equal to the dimension of the filtered estimated system parameter $\hat{q}_i(\bullet)$ 245. The HFIL 220 operates each one of filters 205A-C in the multiple filter system 205 concurrently. The $i^{th}$ filter adapts the $i^{th}$ estimated system parameter $\hat{q}_i(\bullet)=[\hat{q}_1(\bullet), \hat{q}_2(\bullet), \ldots, \hat{q}_i(\bullet), \ldots, \hat{q}_N(\bullet)]$ where all components of the estimated system parameter $\hat{q}_i(\bullet)$ except for the $i^{th}$ parameter estimate $\hat{q}_i(\bullet)$ are held constant. In some aspects, to adapt the filtered estimated system parameter $\hat{q}_i(\bullet)$ 245, the $i^{th}$ filter may compute the scalars $J_{i_q}$ and $R_{i_q}$, which may be referred to as signals of the filter. $J_{i_q}$ may be the gradient of the output prediction-error cost function with respect to the $i^{th}$ estimated system parameter and $R_{i_q}$ may be the $i^{th}$ signal-to-noise ratio formulation for the gradient. At start up, HFIL 220 may initially set the initial parameter estimates to the value of an initial parameter vector $\hat{q}_1(k+1|k+1)=q_2(k+1|k+1)=\ldots\hat{q}N(k+1|k+1)=\hat{q}_0$. The initial parameter vector $\hat{q}_0$ may be defined to suit and may include values that are near the expected values of the time-varying system's 105 parameters, or otherwise may be set to some non-zeros value within the expected parameter estimation range, or another value.

Data sequences are aggregated by the multiple filter system 205 from each filter of the multiple filter system 205 on a moving time-window of w time-steps wide(for some value w≥n, that may be configured based on various tests, where n is the LFOL period). The sequence of prediction errors defined by the moving time-window (k, k−w) of width w≥n, for the $i^{th}$ filter, at time step k, is illustrated by Equation 1, below:

$$\hat{e}(k)_{i,series} = \{e_i(k), e_i(k-1), \ldots, e_i(k-w)\} \quad (1)$$

where $e_i(k)=y(k)-\hat{y}_i(k|k)$. The prediction errors for each filter are shown as $e_i(k+1)$ 255 in FIG. 2.

Similarly, the $i^{th}$ adapted parameter sequence $\hat{q}_{series_i}$, corresponding to the behavior of the $i^{th}$ parameter estimate $\hat{q}_i$ in filtered estimated system parameter $\hat{q}_i$ 245, up to time step k, is illustrated by Equation 2, below:

$$\hat{q}(k|k)_{i,series} = \{\hat{q}_i(k|k), \hat{q}_i(k-1|k-1), \ldots, \hat{q}_i(k-w|k-w)\} \quad (2)$$

The aggregated sequence data for the $i^{th}$ filter includes $\hat{q}(\bullet)_{i,series}$ 245, $\hat{e}(\bullet)_{i,series}$, $\hat{y}_{i,series}(\bullet)$, $\hat{x}_{i,series}(\bullet)$, $J_{iq\ series}(\bullet)$, and $R_{iq\ series}(\bullet)$, corresponding to time series of $\hat{q}(\bullet)_i$, $e_i(\bullet)$ 255, $\hat{y}_i(\bullet)$ 235, $\hat{x}_i(\bullet)$ 270, $J_{iq}(\bullet)$, and $R_{iq}(\bullet)$, respectively, on the moving time-window, w. The predicted system output from the $i^{th}$ filter is denoted $\hat{y}_i(\bullet)$ 235. Equation 3 expresses the contents of each vector $v_1$ aggregated for the $i^{th}$ filter at time step k+1, as can be derived from FIGS. 3-4. Equation 4 below, illustrates the aggregation of each of the time series for the $i^{th}$ filter into an object $\{v_i(\bullet)\}$ 260, which is an object comprised of the time series for the corresponding elements of $v_1$ $(\bullet)$, and is the $i^{th}$ component of an aggregate hypersurface that is dependent on unknown system parameter estimation errors. It should be noted that the behaviors of the aggregated sequence data in the window (k, k−w) may not necessarily carry physical meaning in the context of the time-varying system.

$$v_i(k+1) = \begin{bmatrix} \hat{q}_i(k-1|k-1) \\ e_i(k-1)^T \\ J_{iq}(k+1) \\ R_{iq}(k+1) \\ x_i(k+1|k+1)^T \end{bmatrix} \quad (3)$$

$$\{v_i(k+1)\} = (\hat{q}_{i,series}(k+1|k+1), e_{i,series}(k+1), \hat{x}_{i,series}(k+1), x_{i,series}(k+1|k+1), \quad (4)$$
$$J_{iq,series}(k+1), R_{iq,series}(k+1)).$$

The objects $\{v_i(\bullet)\}$ 260 may be used by the LFOL 225 to infer the filtered estimated system parameters $\hat{q}(\bullet)$ 245. In addition to the data shown in Equation 3, The objects $\{v_i(\bullet)\}$ 260 may also include a sequence of system outputs or predicted/filtered estimated system outputs. The time series results of each filter 205A-C may result from each filter 205A-C's independent effort to reduce its output prediction error to zero. However, $i^{th}$ filter may operate in a failure mode, unable to account for all time-varying system parameters, $q(\bullet)$. Therefore, behaviors of the parameter time series $\hat{q}(\bullet)_{series_i}$, and other $i^{th}$ series, may be nonsensical and rapidly time varying. However, the objective of these parameter adaptations by each of the N filters 205A-C is to provide unique $i^{th}$ component hypersurface behaviors that when aggregated create a larger hypersurface that is predictive of the associated system time-varying parameter values. The prediction errors calculation above can be rewritten, $e_i(k|q(k-1), \hat{q}_i(k-1|k-1))=y(k|q(k-1))-\hat{y}_i(k|k,q; (k-1|k-1))$, to explicitly show the dependency of the $i^{th}$ prediction errors at k on the values of the system parameters, and the $i^{th}$ estimated parameter vector, at k−1. Propagating such dependency through Equations 1-4, provides the hypersurface its predictive power. For the purposes of the discussion herein, the $i^{th}$ filter may adapt only the $i^{th}$ parameter of $\hat{q}_i$. However, in other aspects, particularly where the size of the estimated system output vector, $\hat{y}_i$, is M>1, then the number of parameters that may be adapted by the $i^{th}$ filter may be as many as M. That is, the elements of estimated system parameter vector $\hat{q}_i$ that are adapted by the $i^{th}$ filter may include $\hat{q}_i$, $\hat{q}_{i+a}$, $\hat{q}_{i+b}$, $\hat{q}_{i+c}$, where a, b, c are arbitrary integers and where the individual summations with i does not exceed the size of the estimated system parameter vector $\hat{q}_i$. In such case, each additional adapted element's series analogous to Equations (1) and (2) should be incorporated into the $i^{th}$ hypersurface component, $\{v_i(k+1)\}$, Equation (4), along with corresponding computed signals $\hat{J}_{iq}$, $\hat{J}_{(i+a)q}$, $\hat{J}_{(i+b)q}$, $\hat{J}_{(i+c)q}$ and $\hat{R}_{iq}$, $\hat{R}_{(i+a)q}$, $\hat{R}_{(i+b)q}$, $\hat{R}_{(i+c)q}$. Further, in some aspects the aggregation of all hypersurface components, $\{v_i(k+1)\}$, may globally include adaptations corresponding to all elements of the system parameter vector $q(\bullet)$, however the adapting estimated system parameters, $\hat{q}_i$, need not be globally unique among the filters. For example, both filters 1 and 2 can independently adapt local elements 3 and 6 (i.e., $\hat{q}_1$, $\hat{q}_3$, $\hat{q}_6$ and $\hat{q}_2$, $\hat{q}_3$, $\hat{q}_6$, respectively) of their respective assigned independent estimated system parameter vectors, $\hat{q}_1$ and $\hat{q}_2$. In some embodiments, the subset of parameters adapted by each filter should be different. For example, though filters 1 and 2 may both independently adapt local elements 3 and 6, they each adapt a distinct third parameter, e.g., $\hat{q}_1$ and $\hat{q}_2$, respectively. Thus, the subset of parameters filter 1 and filter 2 adapt are different.

Turning to the LFOL 225, the LFOL 225 may perform operations every n time steps, where the value of the period n may be an integer multiple of the period of HFIL 220. The value of the period n may be based on testing, such that n≥τ, where t is the period of the HFIL 220. The LFOL 225 may perform inference operations every n time steps, i.e., at time steps k=n, 2n, 3n, and so on, inferring parameter estimates based on the objects $\{v(\bullet)\}$ 260 that are obtained from the HFIL 220 at such k intervals.

In some aspects, the LFOL 225 includes a state and parameter estimator 210. The state and parameter estimator 210 receives output from the HFIL 220 which may be the multi-dimensional hypersurface with objects $\{v(\bullet)\}$ 260. Object $\{v(\bullet)\}$ 260 may be a collection of all objects $\{v_i(\bullet)\}$, i=1, N. The state and parameter estimator 210 may preprocess object $\{v(\bullet)\}$ 260 using a Sample( ) function. The Sample( ) function may extract a subset of the time series data in each of the N objects $\{v_i(\bullet)\}$, and provide the extracted subset, in some combination (e.g., a mathematical combination), to a suitably prior-trained neural network $g_{NN}(\bullet)$. As will be described below, neural network $g_{NN}(\bullet)$ may infer the system parameters estimate $\hat{q}(\bullet)$ 265. The state and parameter estimator 210 may generate system state estimate $\hat{x}(\bullet)$ 275 The state and parameter updater 215 may replicate these system state estimate $\hat{x}(\bullet)$ 275 and system parameters estimate $q(\bullet)$ 265, N times to re-initialize the $i^{th}$ filtered estimated system state $\hat{x}_i(\bullet)$ 270 and filtered estimated system parameter $\hat{q}_i(\bullet)$ 245 of the N filters processing prediction errors in the HFIL 220. The preprocessing done by the Sample( ) function may be accomplished by the adaptive state and parameter estimator 730 as described with respect to FIG. 7.

The Sample( ) function may extract at least one of the time series data from each object $\{v_i(\bullet)\}$ 260 and supply the output of the Sample( ) function to state and parameter estimator 210 as an input. In some embodiments, state and parameter estimator 210 may include a neural network, such as a feed forward neural network $g_{NN}(\bullet)$. In some aspects, the Sample( ) function may extract the full set of data, comprising all aggregated time-series data $\{v_i(\bullet)\}$ 260 developed by each of the N filters in the multiple filter system 205. Additionally, the inputs to state and parameter estimator 210 at time step k+1 may also include the prior system parameters estimate at k, $\hat{q}(k|k)$ (as shown in FIG. 6 and in Equation 5a, below). Using the information provided by Sample( ) function and the prior system parameter estimate $\hat{q}(k|k)$, the state and parameter estimator 210 may infer the accurate filtered system parameters estimate $\hat{q}(k+n|k+n)$ 265, as depicted in Equations 5(a)-(d), below.

$$\hat{q}(k|k+n) = g_{NN}(\hat{q}(k|k), \text{Sample}(\{v_1(k+1)\}, \{v_2(k+1)\}, \{v_3(k+1)\}, \ldots, \{v_N(k+1)\})) \quad (5a)$$

Alternatively, state and parameter estimator 210 may infer the parameter adjustments, Δq(k+n), and the value of the estimate may be determined from adding the adjustment to the past value, i.e., q̂(k|k+n)=q̂(k|k)+Δq(k+n), as illustrated in Equations (5b) and (5c) below:

$$\Delta q(k|k+n) = g_{NN}(\hat{q}(k|k)), \quad (5b)$$
$$\text{Sample}(\{v_1(k+1)\}, \{v_2(k+1)\}, \{v_3(k+1)\}, \ldots, \{v_N(k+1)\}))$$
$$\hat{q}(k|k+n) = \hat{q}(k|k) + \Delta q(k|k+n) \quad (5c)$$

Because q̂(k|k+n) is estimated backwards in time, via smoothing, the likely best prediction of the future value, at time k+n, is the smoothed past value, as assigned below:

$$\hat{q}(k+n|k+n) = \hat{q}(k|k+n) \quad (5d)$$

As LFOL 225 operates, each $i^{th}$ filtered estimated system parameter q̂$_i$(k+1|k+1) 245 and filtered estimated system state x̂$_i$(k+1|k+1) 270 are refreshed by assigning the value of the time-varying system 105's filtered system parameters estimate q̂(k+n|k+n) 265 and filtered system states estimate x̂(k+n|k+n) 275, respectively. The filtered system parameters estimate q̂(k+n|k+n) 265 and filtered system state estimate x̂(k+n|k+n) 275 are then passed through signal transformer 240 and state and parameter updater 215. The state and parameter updater 215 transformation is illustrated by Equations 6(a) and 6(*b*) below.

$$\hat{q}_1(k+1|k+1) = \hat{q}_2(k+1|k+1) = \ldots \hat{q}_N(k+1|k+1) = \hat{q}(k+n|k+n) \quad (6a)$$
$$\hat{x}_1(k+1|k+1) = \hat{x}_2(k+1|k+1) = \ldots \hat{x}_N(k+1|k+1) = \hat{x}(k+n|k+n) \quad (6b)$$

The process may then continue back to the HFIL 220 which effectively starts the process again at time step k+1. A signal transformer 230 may shift the estimated parameters 245 and states 270 at time step k+1 to the estimated parameters and states for time step k before the estimated parameters q̂$_i$(k+1|k+1) 245 and state vector x; (k+1|k+1) 270 are returned as inputs to the multiple filter system 205.

Control system 110 may receive filtered system parameters estimate q̂(k+n|k+n) 265 and system state estimate x(k+n|k+n) 275. As discussed above, signal transformer 240 may shift the system parameters estimate q̂(k+n|k+n) 265 and system state estimate x̂(k+n|k+n) 275 at time step k+n to be the filtered system parameters and filtered system states for time step k before the system parameters estimate q̂(k+n|k+n) 265 and system state estimate x̂(k+n|k+n) 275 are sent as inputs to the control system 110.

An additional benefit of embodiments discussed herein is that the updated output prediction errors provide observability of the relative accuracy of the state and parameter estimates. For such observability purposes, the inferred system parameters estimate q̂(k+n|k+n) 265 may update the filtered system state estimate and the output prediction errors as follows:

$$\hat{x}(k+n|k+n) = f_{RNN}(\hat{x}(k|k), \hat{q}(k+n|k+n), u(k)) \quad (7)$$
$$\hat{y}(k+n|k+n) = h_{RNN}(\hat{x}(k+n|k+n))$$
$$e(k+n) = y(k+n) - \hat{y}(k+n|k+n) \quad (8)$$

Errors in the state and parameter estimates may be defined as follows in Equations (9) and (10), below:

$$e_x(k+n) = x(k+n) - \hat{x}(k+n|k+n) \quad (9)$$
$$e_q(k+n) = q(k+n) - \hat{q}(k+n|k+n) \quad (10)$$

These error values may be unknown when the operation of the adaptive state and parameter estimator 130 provides estimates for the time-varying system 105. However, the error values may be known during neural network model training and validation where a correlation between the prediction errors, Equation 8, and the estimation errors, Equations 9 and 10, can be established, e.g., such that when the sum of the squares of the output prediction errors e(k+n)=y(k+n)−ŷ(k+n|k+n) is less than some value, delta (Δ), then the state and parameter estimation errors are less than values $\delta_x$ and $\delta_q$, respectively, as formulated in Equation 11, below:

$$\text{For } e(k+n)^T e(k+n) \Delta, \text{ then} \quad (11)$$
$$e_x(k+n)^T e_x(k+n) < \delta_x \text{ and } e_q(k+n)^T e_q(k+n) < \delta_q$$

The value of delta (Δ) may be determined from experience and set to a predefined value. The value of delta (Δ) may also be determined during neural network training and validation. Similarly, the values for $\delta_x$, $\delta_q$ may be determined from neural network training and validation. In some aspects, the neural network $g_{NN}(\bullet)$ in state and parameter estimator 210 may be trained to map a subset of the time-series data $\{v_i(k+1)\}$ where i=1, 2, ..., N, defined by Sample(•) function in combination with the prior filtered system parameter estimates q̂(k|k) to the known system parameters q(k) at time step k. The training data for the neural network $g_{NN}(\bullet)$ may include such sampled components of objects $v_i$ that are generated by the filters 205A-C in the multiple filter system 205, applied to a first-principles model, an appropriately instrumented testbed or a system prototype, or other suitable data source. Attributes of such models, testbeds, prototypes, and data sources may include system parameters q(•), that are known and varied in rich patterns during sufficiently rich target system inputs u(•) also generating the corresponding system outputs and states for training. There are many neural network architectures (including feedforward, recurrent, convolutional, and others), suitable transformation functions (including linear and non-linear functions, empirical and first-principles), training methods (e.g., supervised learning, reinforcement learning, generative, and others), and several combinations of the data contained in the N objects $v_i(\bullet)$ that can be utilized to create a sufficient mapping from the developed time series data to the time-varying system parameters q(k).

FIG. 3 is a block diagram 300 of a multiple filter system 205, according to aspects of the disclosure. The multiple filter system 205 may receive system output y(•) 160 from the time-varying system 105, system input u(k) 155, and prior filtered estimated system parameters estimates $\hat{q}_1(k|k)$, ..., $\hat{q}_N(k|k)$ 245A-C. In some aspects, the filtered estimated system parameters $\hat{q}_1(k|k)$, ..., $\hat{q}_N(k|k)$ 245A-C may have been generated by the filters 205A-C at a previous time step. Not shown in FIG. 3 are the prior filtered estimated systems state, $\hat{x}_1(k|k)$, ..., $\hat{x}_N(k|k)$ that also, analogously, initialize filters 245A-C and are also recursively generated during the adaptation periods. As discussed above, multiple filter system 205 may include N filters, depicted as collection of filters 205A-C where N=3. As discussed above, multiple filter system 205 is included in the HFIL 220. In some aspects, the HFIL 220 may operate all or a subset of filters 205A-C concurrently to generate a collection of time-series data associated with each iteration of the filters 205A-C. Filters 205A-C may project output prediction errors 255A-C, concerning measured real system outputs into component objects 260A-C which are hypersurfaces that have behaviors that are partly attributable to the behaviors of the unknown system parameters q(•) of the time-varying system 105. The filters 205A-C may be run concurrently, each adapting at least one parameter. Component objects 260A-C are generated by each filter 205A-C and may be combined to create a series of objects {v_i(•)} (Equation 4). The estimated system parameter behaviors output by each of the multiple filters 205A-C may be nonsensical relative to physical meanings, since each may be unable to reconcile the behaviors of the full scope of the system time-varying parameters that influence the behavior of the prediction errors. However, the objective of each of the filters 205A-C is to provide a component hypersurface that is partly indicative of the behaviors the associated time-varying parameter behaviors in the time-varying system 105. The resulting aggregate hypersurface may comprise a collection of the such responses of each filter in filters 205A-C as each filter tries to minimize its output prediction errors. The aggregate hypersurface is associated by the filters with a system input-output sample and may be predictive of a collection of system time-varying parameters that influenced the system output sample and can therefore be classified by such parameter collection when known during neural network training.

There may be several variations and aspects of the multiple-models method, including neural network and non-neural network models, software and hardware implementations, and various algorithms for updating the estimated parameter estimates (including gradient descent, heuristics, probabilistic methods, genetic algorithms, and others), to produce a suitable error surface for use as describe in this disclosure. The best performance may occur when the system parameters estimate $\hat{q}(•)$ correspond to a suitable full scope of the time-varying system parameters q(•); each filter of the multiple-filters system has good accuracy(e.g., accuracy measured within certain predefined accuracy range) predicting the real system's output behavior at time k+1, when q(k) is known, i.e., $\hat{q}(k|k)=q(k)$; each parameter in q(•) has sufficiently independent behaviors (e.g., behaviors that are dependent by less than a predefined threshold); and the variations of each parameter in q(•) causes detectable, and unique behavioral changes in the behaviors of the time-varying system 105.

The maximum number of parameters nmax that can be updated by one of filters 205A-C is nmax≤M, where M is the size of the output prediction error vector e(•).

In some aspects, the filters 205A-C may be neural networks, other empirical structures, first-principles models, hardware structures, or other structures where a set of estimated system parameters $\hat{q}(•)$ may be individually updated to generate suitable error surfaces corresponding to changes relating the time-varying system 105's parameters and the filter output prediction errors 255A-C.

Because the multiple filter system 205 may require a minimum level of excitement in the output of the time-varying system 105, the dynamics of the time-varying system 105 may be excited by input from a dither signal 305, as illustrated in FIG. 3. A dither signal 305 may add a randomized signal to the system input u 155. If the time-varying system 105's natural dynamics and process noise are insufficiently excited to cause the multiple filter system 205 to correctly interpret the behavior of the time-varying system 105, then a dither signal 305 with a suitably defined magnitude and frequency may be incorporated.

FIG. 4 is a schematic diagram of a filter that contributes to some aspects of this disclosure. FIG. 4 depicts a filter adapted to the requirements of the $i^{th}$ filter in the multiple filter system 205 according to some aspects of the disclosure. A filter 405 may be one of the filters 205A-C within the multiple filter system 205 discussed above. The filter 405 may include one or more neural networks, such as neural network state predictors 410A-B, neural network output estimator 415, and a function module 420. FIG. 4 also depicts system input u 155, system output y 160, a predicted system output $\hat{y}$ 435, filtered estimated system state $\hat{x}$ 440, and filtered estimated system parameter $\hat{q}_i$ 445. The vector $J_{iq}(•)$ 450 is the gradient of the output prediction-error cost function with respect to the $i^{th}$ estimated system parameter and $R_{iq}(•)$ 455 is a gain that may be defined in a signal-to-noise ratio formulation for gradients of $J_{iq}(•)$ 450, a predefined gain, or other definition from experience. The outputs of filter 405, e.g., 440, 445, 450, 455, may be referred to as signals of the filter 405 and are included in a hypersurface of the filter 405. Recall, that relative time is indicated by, for example, k+1, k, k−1, etc., relative delay notation is used to explicitly indicate recursion in the flow diagram and the relative timing of such signals due to recursion. Thus, it should be understood that all times in the arguments of the various inputs, outputs, and signals may be shifted, e.g., k→k+α, where α is any integer, without changing the operation of the system, provided all arguments are shifted by the same amount α.

Filter 405 may be constructed from the prior-trained neural network state predictors 410A-B and output estimator 415. Neural network state predictors 410A-B may be recurrent neural networks $f_{RNN}(\ )$ and output estimator 415 may be a neural network $h_{NN}(\ )$ The neural network state predictor 410A may receive inputs that include the filtered estimated system parameters $\hat{q}_i$ 445A (which are filtered estimated system parameters $\hat{q}_i$ 445 shifted using signal transformer 425), system input u 155, and filtered estimated system state x; 440A (which is filtered estimated system state $\hat{x}_i$ 440 shifted by signal transformer 430) and generate predicted system state $\hat{x}_i(k|k-1)$ 442, shown in Equation 12A, below:

$$\hat{x}_i(k|k-1) = f_{RNN}(\hat{x}_i(k-1|k-1), \hat{q}_i(k-1|k-1), u(k-1)) \quad (12A)$$

The neural network state predictors 410B may receive inputs that include the filtered estimated system parameters $\hat{q}_i$ 445, system input u 155, filtered estimated system state $\hat{x}_i$ 440A as inputs and generate a filtered estimated system state $\hat{x}_i(k|k)$ 440, shown in Equation 12B, below:

$$\hat{x}_i(k|k) = f_{RNN}(\hat{x}_i(k-1|k-1), \hat{q}_i(k|k), u(k-1)) \quad (12B)$$

The output estimator 415 may receive predicted system state $\hat{x}$ 442 as input and generate predicted system output $\hat{y}(k|k-1)$ 435, as also shown in Equation 13, below.

$$\hat{y}_i(k|k-1) = h_{NN}(\hat{x}_i(k|k-1)) \quad (13)$$

In some aspects, filter 405 may include an output prediction error cost function 460. The output prediction error cost function 460 may determine output prediction errors e; 255 from system output y(k) 160 and predicted system output $\hat{y}_i(k|k-1)$ 435. The output prediction error cost function 460 may be the sum of the squares of the components of the prediction error.

The function module 420 may receive filtered estimated system parameters $\hat{q}_i$ 445A and output prediction errors $e_i$ 255, and generate smoothed estimated system parameters 445F in real-time by stochastic gradient descent applied to the $i^{th}$ element of $\hat{q}_i$ 445A, as also shown in Equation 14.

$$\hat{q}_i(k-1|k) = \hat{q}_i(k-1|k-1) + R_{qi}(k)J_{qi}(k) \quad (14)$$

Filter 405 determines the filtered estimated system state $\hat{x}_i$ by re-introducing the updated smoothed estimated system parameters 445F into the neural network state predictor 410B ($f_{RNN}( )$), as shown in the Equation 15, below. The best estimate, at time step k, for a filtered estimated system parameters $\hat{q}_i(k|k)$ 445 is $\hat{q}_i(k-1|k)$ 445F, as shown below in Equation 16:

$$\hat{x}_i(k|k) = f_{RNN}(\hat{x}_i(k-1|k-1), \hat{q}_i(k-1|k), u(k-1)) \quad (15)$$

$$\hat{q}_i(k|k) = \hat{q}_i(k-1|k) \quad (16)$$

In some aspects, vectors $\hat{q}$ 445 and $\hat{y}$ 435 may have respective sizes N and M, wherein M and N are integers. Further, the maximum number of parameters that may be stably adapted by the $i^{th}$ filter 405, performed by equations 12-16, is M. Otherwise, filter 405 may diverge.

Figure 5A:
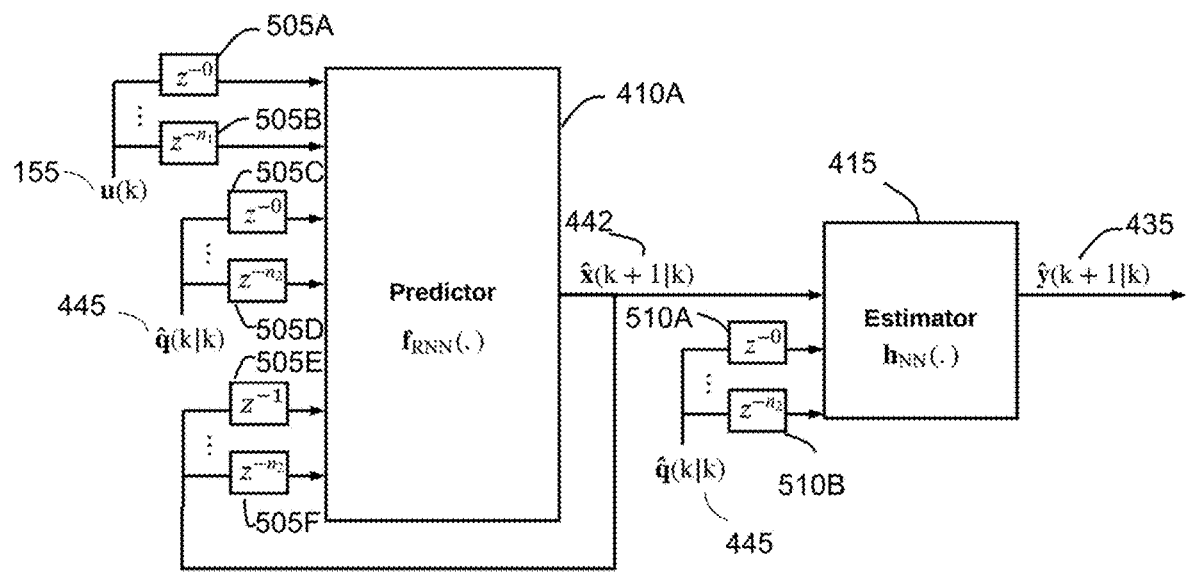
FIGS. 5A-B are schematic diagrams of state and output predictor and estimator neural network configurations, according to various aspects of the disclosure.

FIG. 5A is a block diagram of a neural network state predictor and an output estimator, according to aspects of the disclosure. FIG. 5A illustrates a generalization of neural network state predictor $f_{RNN}(\cdot)$, implemented by 410A and 410B, and output estimator $h_{NN}(\cdot)$, implemented by 415. It should also be noted that due to the flexibility of neural networks the estimators $f_{RNN}(\cdot)$ and $h_{NN}(\cdot)$ can be combined into one neural network, the separate descriptions of $f_{RNN}(\cdot)$ and $h_{NN}(\cdot)$ are utilized to provide clarity of the functional behaviors, and not to restrict the architecture of the neural network or system of neural networks.

Neural network state predictor 410A ($f_{RNN}(\cdot)$) receives control input vector, which is system input u 155, filtered estimated system parameters $\hat{q}$ 445 (which may be approximated by a smoothed estimated system parameter from a previous timestep, as described above), and estimated system state $\hat{x}$ generated by state predictor 410A at an earlier time step as input and generates a predicted system state $\hat{x}$ 442. The output estimator 415 receives predicted system state $\hat{x}$ 442 generated by the neural network state predictor 410A and filtered estimated system parameters $\hat{q}$ 445 as input and generates predicted system output $\hat{y}$ 435.

In some aspects, the input to neural network state predictor 410A may be transformed using signal transformer blocks 505A-F to create delayed inputs. For example, system input u 155 may be passed through signal transformer blocks 505A-B before being fed into neural network state predictor 410A. In another example, input $\hat{q}$ 445 may be passed through signal transformer blocks 505C-D before being fed into neural network state predictor 410A. In another example, predicted system state $\hat{x}$ 442, which was an output from neural network state predictor 410A at an earlier time step (e.g., step k), may be passed through signal transformer blocks 505E-F to become the estimated system state $\hat{x}$ before being fed into neural network state predictor 410A. In some embodiments, state predictor 410A may receive the updated filtered estimated system state 270, generated by the LFOL 225, as input. In some embodiments, neural network state predictor 410B may have similar structure to 410A.

In some aspects, the input to output estimator 415 may be transformed using signal transformer blocks 510A-B to create delayed inputs. For example, filtered estimated system parameters $\hat{q}$ 445 may be passed through signal transformer blocks 510A-B before being input into output estimator 415.

Figure 5B:
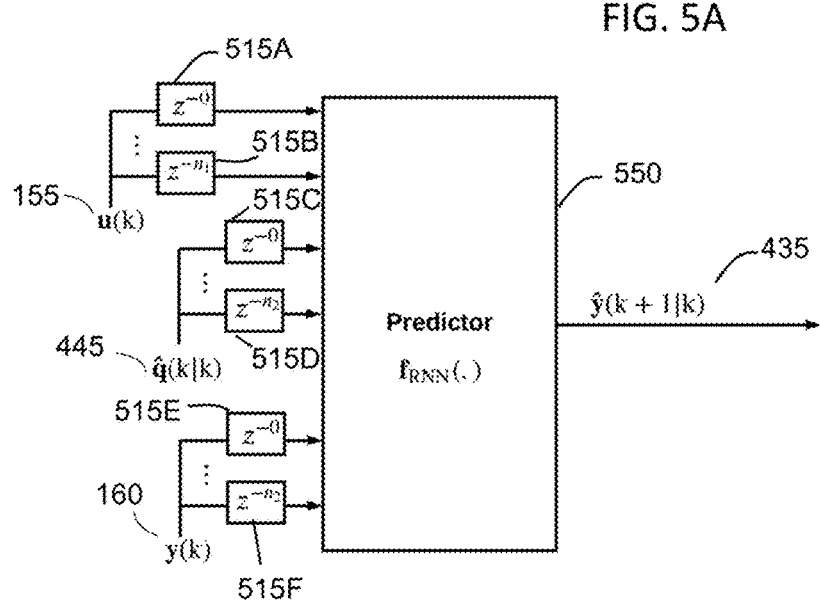

FIG. 5B is a block diagram of a generalized neural network output predictor, according to aspects of the disclosure. FIG. 5B illustrates an embodiment where a neural network state predictor and a separate output estimator are replaced by an output predictor $f_{RNN}(\cdot)$ 550. This may occur when sufficient states are not accessible for developing the training datasets or when the system outputs are also explicitly system states. In such case, the predicted estimated system outputs 435 may also serve the function of the predicted system states and filtered estimated system states, often with the support of increased levels of recurrency in the system outputs (as delayed inputs). The output recurrency utilized in FIG. 5B may be as illustrated, i.e., the true system output, y(•), or may alternately be the recurrent predicted system output estimates, $\hat{y}$ (•) . . . . This choice is subject to trial and error on a case-by-case basis to determine which configuration yields better performance. Therefore, as described herein, the "predicted system state" or "filtered estimated system state" also includes output predictions and output estimates when $f_{RNN}(\cdot)$, as shown in FIG. 4, does not include sufficient state estimates, and provides estimated system output, $\hat{y}(\cdot)$. Also, the recursive use of delayed inputs of the filtered estimated system states, in such case, may be either the true system outputs or the filtered estimated system outputs.

In some aspects, neural network output predictor 550 may receive system input u(k) 155, filtered estimated system parameters $\hat{q}(k|k)$ 445, and system output y(k) 160 as input and may generate predicted system output $\hat{y}$ (k+1|k) 435 as output.

In some aspects, the input to neural network state predictor 550 may be transformed using signal transformer blocks 515A-F to create delayed inputs. For example, system input u(k) 155 may be passed through signal transformer blocks 515A-B before being fed into neural network state predictor 410B. In another example, input q̂(k|k) 445 may be passed through signal transformer blocks 515C-D before being fed into neural network state predictor 550. In yet another example, input y(k) 160 may be passed through signal transformer blocks 515E-F before being fed into neural network state predictor 410B.

In some aspects, the neural network state predictor 410A may be a recurrent neural network (RNN), though the implementation is not limited to this embodiment. The output estimator 415 may utilize a feedforward neural network (NN), though the implementation is not limited to this embodiment. In some aspects, other architectures may be utilized for the neural networks. The neural networks may be replaced by other structures, implemented in either software of hardware, and utilizing empirical, first-principles, or hybrid formulations. Also, where the state-estimates are also (measured) system outputs, the output estimator may be omitted (e.g., as depicted in FIG. 5B), since the neural network output predictor (e.g., 550) can estimate such values directly. As depicted in FIG. 5A, when an output estimator 415 is utilized, the filtered estimated system parameters q̂(k|k) 445 can be optionally included in its input field to facilitate faster model training. In the shown neural network formulation, the input field of the state-predictor includes the system input u 155 and the associated recurrent states (e.g., 442) and estimated system parameters q̂(k|k) 445. Further, in lieu of explicit state-space representations of the target system (e.g., time-varying system 105), filters (e.g., filters 205A-C) may include only output predictions and parameter estimates as a sufficient condition for their construction and operation.

Prior to incorporating neural network predictors 410A-B, 550 ($f_{RNN}(\ )$) and output estimator 415 ($h_{NN}(\ )$) into the filtering process, neural network predictors 410A-B, 550 ($f_{RNN}(\ )$) and output estimator 415 ($h_{NN}(\ )$) may be trained. In some aspects, neural network predictors 410A-B, 550 ($f_{RNN}(\ )$) and output estimator 415 ($h_{NN}(\ )$) may be trained using supervised learning and data generated from first-principles software models of the target system, a highly instrumented testbed version or prototype of the real target system, or some combination of these approaches. The objective of the neural network training is to establish accurate neural network predictors 410A-B, 550 ($f_{RNN}(\ )$) and output estimator 415 ($h_{NN}(\ )$) of the input-output dynamical response of the predicted system states x̂ and mapping of the predicted states to the predicted system outputs ŷ, respectively, where the predictions of the system outputs and states are parametric in the estimated system parameter vector q̂(k). Thus, the estimated system parameter q̂(k) is nominally included in the input field of the neural network predictors 410A-B, 550, $f_{RNN}(\ )$ However, the estimated system parameters can also be incorporated directly as neural network weights or as embedded transformations, or other means. In some aspects, the measured real-system outputs are also system states that can be directly modeled by neural network state predictor 550 ($f_{RNN}(\ )$).

Figure 6A:
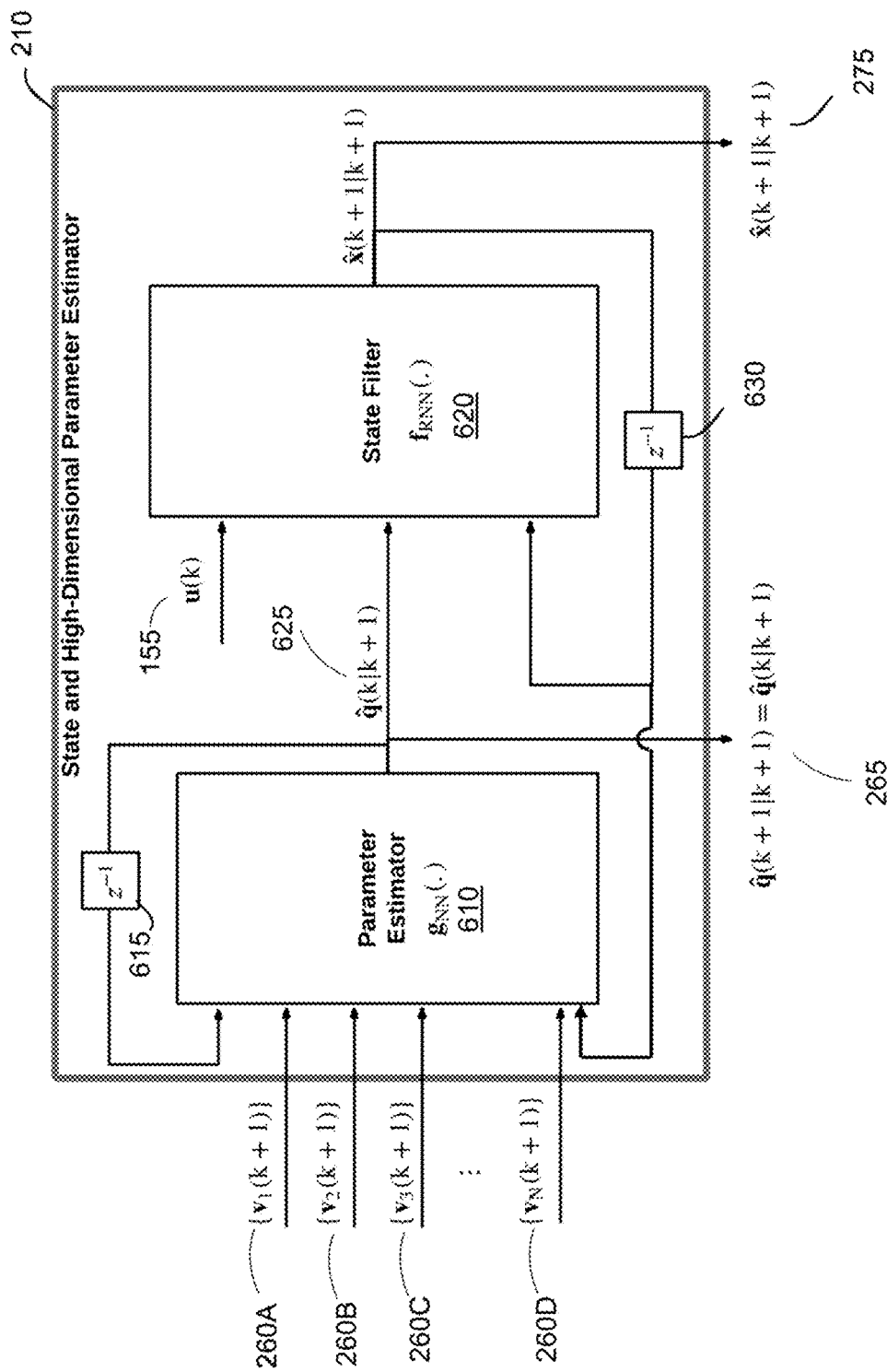
FIGS. 6A-B are schematic diagrams of a state and parameter estimator, according to various aspects of the disclosure.

FIG. 6A is a block diagram of a state and parameter estimator 210, according to some embodiments. As discussed above, state and parameter estimator 210 may perform parameter estimation during the LFOL 225. State and parameter estimator 210 may include a parameter estimator 610 and a state filter 620. Parameter estimator 610 may receive filtered system parameters estimate q̂(k|k), which is filtered system parameters estimate q̂(k+1|k+1) 625 shifted using signal transformation block 615, filtered system state estimate x̂(k|k), which is filtered system state estimate x̂(k+1|k+1) 275 shifted using signal transformation block 630, and the time-series objects {$v_1(k+1)$}, {$v_2(k+1)$}, {$v_3(k+1)$}, . . . , {$v_4(k+1)$} 260A-D, where FIG. 6A assumes that the Sample( ) function, discussed above, does not omit any of, or any part of, these time-series objects. In some embodiments, the Sample( ) function may preprocess the time-series objects 260A-D as described herein before they are received as input. As discussed above, time-series objects {$v_1(k+1)$}, {$v_2(k+1)$}, {$v_3(k+1)$}, . . . , {$v_4(k+1)$} 260A-D were generated by the multiple filter system 205 which operates in the HFIL 220. The parameter estimator 610 generates an output that is the smoothed system parameters estimate q̂(k|k+1) 625, which are also the best estimate of the filtered system parameters estimate q̂(k+1|k+1) 265.

In some embodiments, the training data for parameter estimator INN 610 may include such sampled components of objects $v_i$ that are generated by the filters 205A-C in the multiple filter system 205, applied to a first-principles model, an appropriately instrumented testbed or a system prototype, or other suitable data source. Attributes of such models, testbeds, prototypes, and data sources may include system parameters q(•), that are known and varied in rich patterns during sufficiently rich target system inputs u(•). There are many neural network architectures (including feedforward, recurrent, convolutional, and others), suitable transformation functions (including linear and nonlinear functions, empirical and first-principles), training methods (e.g., supervised learning, reinforcement learning, generative, and others), and several combinations of the data contained in the N objects $v_i(•)$ that can be utilized to create a sufficient mapping from the developed time series data to the time-varying system parameters q(k).State filter 620 may receive smoothed system parameters estimate q(k|k+1) 625, system input u(k) 155, and the recurrent filtered system state estimate x̂(k| k) to generate the filtered system state estimate x̂(k+1|k+1) 275. It should be noted that, as discussed in relation to FIG. 5B, the state filter, 620, may also be an output predictor, or a combination of both, as required to develop the suitable predictive function, 620. In such case, as discussed in relation to FIG. 5B, such predicted system outputs, serve the function of filtered estimated system states as described herein.

Figure 6B:
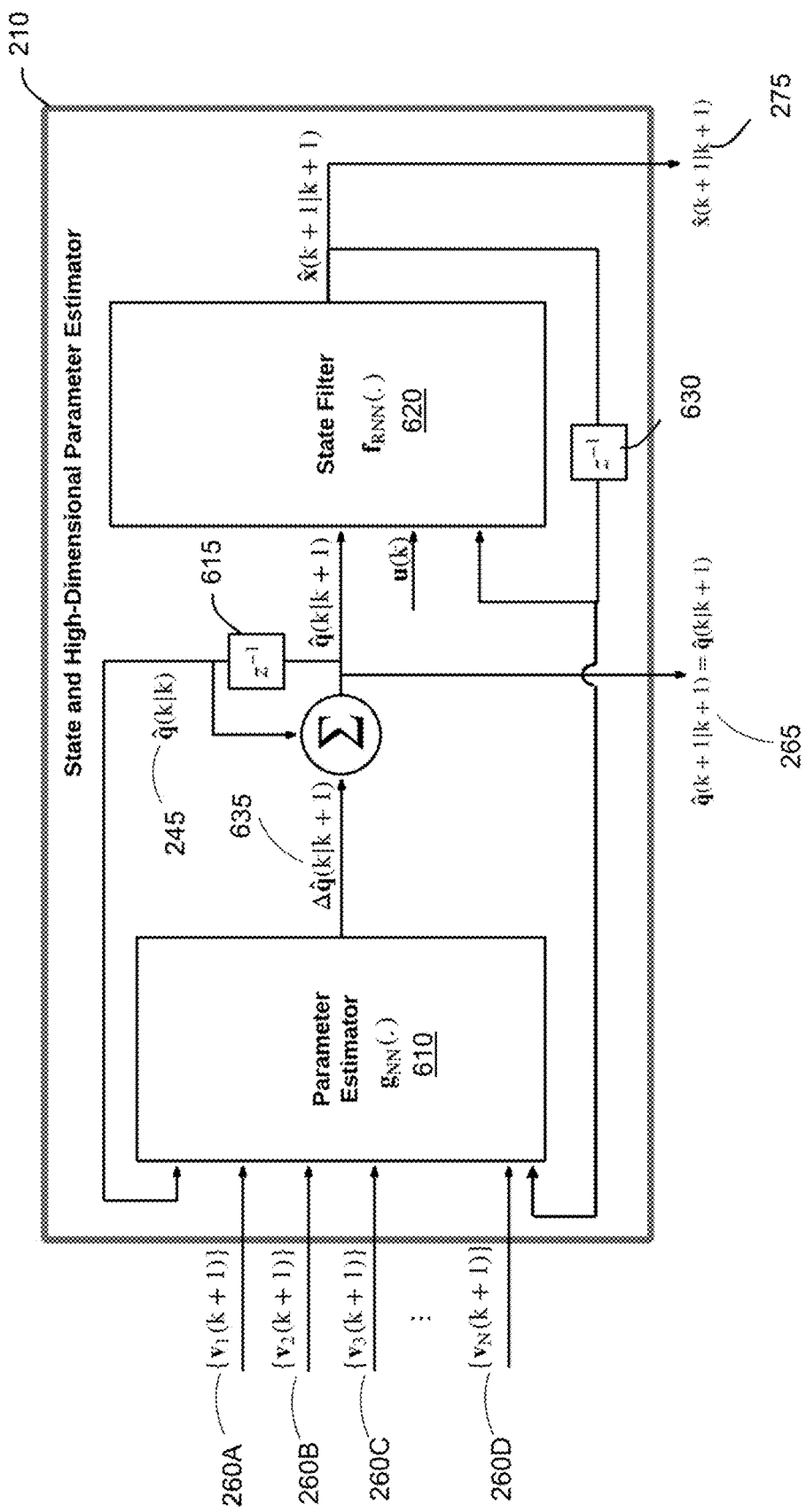

FIG. 6B is block diagram of another state and parameter estimator 120, according to some embodiments. State and parameter estimator 210 may include a parameter estimator 610 and a state filter 620. Parameter estimator 610 may receive system parameters estimate q̂(k|k) 445, which is system parameters estimate q̂(k+1|k+1) shifted using signal transformation block 615, filtered system state estimate x̂(k|k), which is filtered system state estimate x̂(k+1|k+1) shifted using signal transformation block 630, and the time-series objects {$v_i(k+1)$}, {$v_2(k+1)$}, {$v_3(k+1)$}, . . . , {$v_4(k+1)$} 260A-D, where the FIG. 6B assumes that the Sample( ) function, discussed above, does not omit any of, or any part of, these time-series objects. The parameter estimator 610 generates an output that is the parameter adjustment Δq̂(k|k+1) 635. The filtered system parameter estimate, q̂(k+1|k+1) 265, may then be computed by adding filtered system parameters estimate q̂(k|k) 445 and parameter adjustment Δq̂(k|k+1) 635 as described in Eq. 5c. The state filter 620 in FIG. 6B may be the same as the embodiments described in FIG. 6A. It should be noted that, as discussed in relation to FIG. 5B, the state filter, 620, may also be an output predictor, or a combination of both, as required to develop the suitable predictive function, 620. In such case, as discussed in relation to FIG. 5B, such predicted system outputs, serve the function of filtered estimated system states as described herein.

Figure 7:
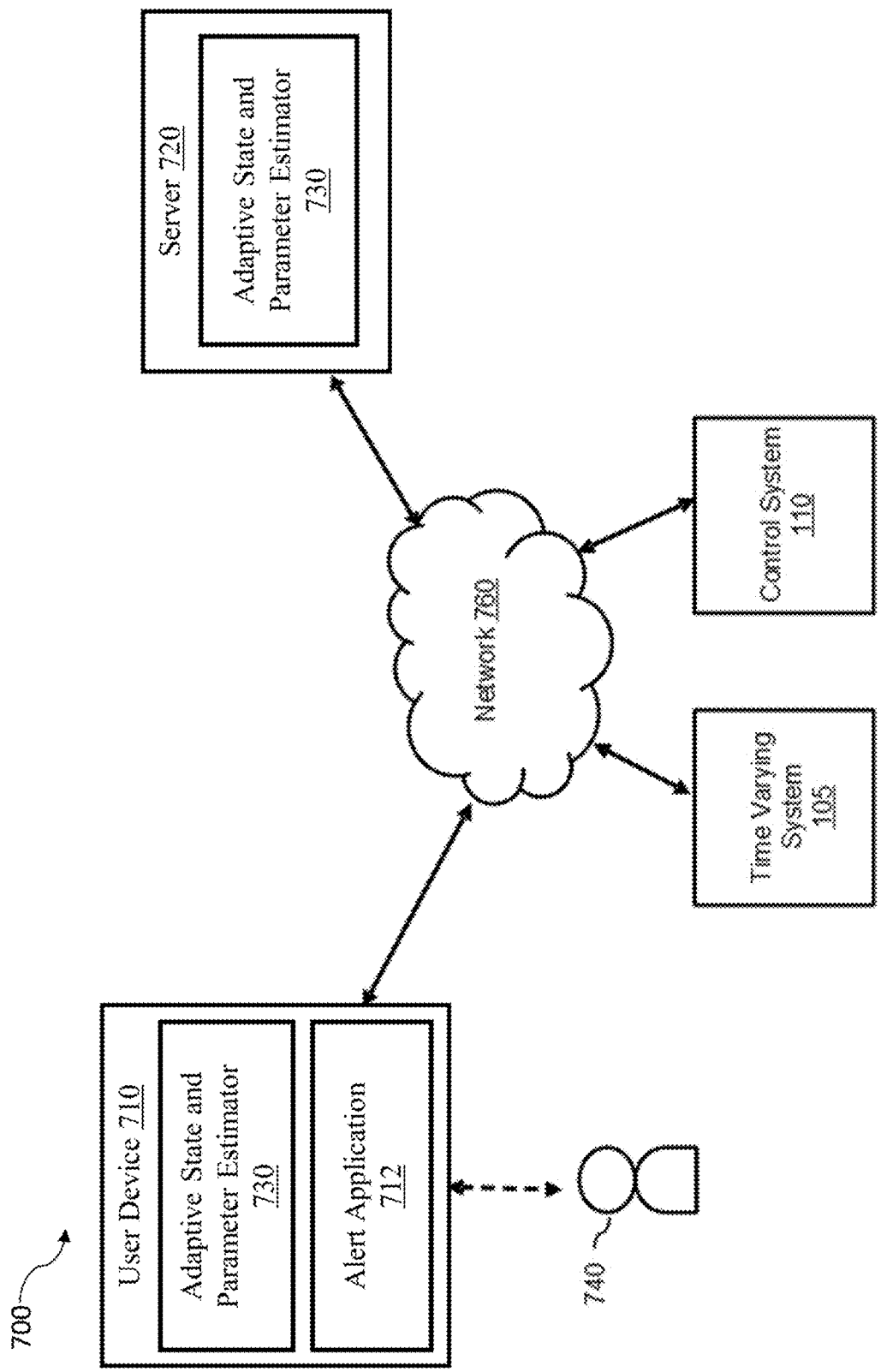
FIG. 7 is a simplified block diagram of a network system suitable for implementing a failure management system for a time-varying system, according to various aspects of the disclosure.

FIG. 7 is a simplified block diagram of a networked system 700 suitable for implementing the state and parameter estimation framework of FIGS. 1-6. In one aspect, system 700 includes the user device 710 which may be operated by user 740, server 720, and other forms of devices, servers, and/or software components that operate to perform various methodologies in accordance with the described aspects. Exemplary devices and servers may include device, stand-alone, and enterprise-class servers, operating an OS such as a MICROSOFT® OS, a UNIX® OS, a LINUX® OS, or other suitable device and/or server-based OS. It can be appreciated that the devices and/or servers illustrated in FIG. 7 may be deployed in other ways and that the operations performed, and/or the services provided by such devices and/or servers may be combined or separated for a given aspect and may be performed by a greater number or fewer number of devices and/or servers. One or more devices and/or servers may be operated and/or maintained by the same or different entities.

Additionally, networked system 700 may include a control system 110 and a time-varying system 105. Example control system 110 may be an onboard computer capable of relaying instructions to reconfigure a target system discussed above. Example time-varying system 105 may be the target system.

User device 710, server 720, control system 110, and time-varying system 105 may be connected by network 760. Network 760 may be implemented as a single network or a combination of multiple networks. For example, in various aspects, network 760 may include the Internet or one or more intranets, landline networks, wireless networks, and/or other appropriate types of networks. Thus, network 760 may correspond to small scale communication networks, such as a private or local area network, or a larger scale network, such as a wide area network or the Internet, accessible by the various components of system 700.

The user device 710 and the server 720 may communicate with each other over a network 760. User device 710 may be utilized by a user 740 (e.g., a driver, a system admin, etc.) to access the various features available for user device 710, which may include processes and/or applications associated with the server 720.

User device 710 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 700, and/or accessible over network 760.

User device 710 may be implemented as a communication device that may utilize appropriate hardware and software configured for wired and/or wireless communication with the server 720. For example, in one aspect, user device 710 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 710 of FIG. 7 contains an alert application 712 which may correspond to executable processes, procedures, and/or applications with associated hardware. For example, the user device 710 may receive a message indicating the time-varying system 105 status, i.e., operating nominally or operating near failure, from the server 720 and display the message via the alert application 712. In some aspects, estimated parameters may be received at the user device 710 and displayed to a user through the alert application 712. In some instances, the alert application 712 may activate upon receipt of the system parameters estimate or when the system parameters estimate are abnormal. In other aspects, user device 710 may include additional or different modules having specialized hardware and/or software as required.

In some aspects, user device 710 may include adaptive state and parameter estimator 730. The adaptive state and parameter estimator 730 may carry out the processes and methods described with respect to the adaptive state and parameter estimator 130. User device 710 may further include a database stored in a transitory and/or non-transitory memory of user device 710 or external component communicatively connected to network 760, which may store data generated by time-varying system 105, control system 110, and/or adaptive state and parameter estimator 130.

The server 720 may also include adaptive state and parameter estimator 730. Likewise, server 720 may include a database that may be stored in a transitory and/or non-transitory memory of the server 720 and may store data generated by time-varying system 105, control system 110, and/or adaptive state and parameter estimator 130.

In some aspects, user device 710 and server 720 may store portions of the adaptive state and parameter estimator 730. For example, the portion of adaptive state and parameter estimator 730 that estimates the parameters and states may be stored on server 720, and a portion that determines errors in the filtered parameters and states, as well as displays the parameters and states may be included in user device 710.

Figure 8:
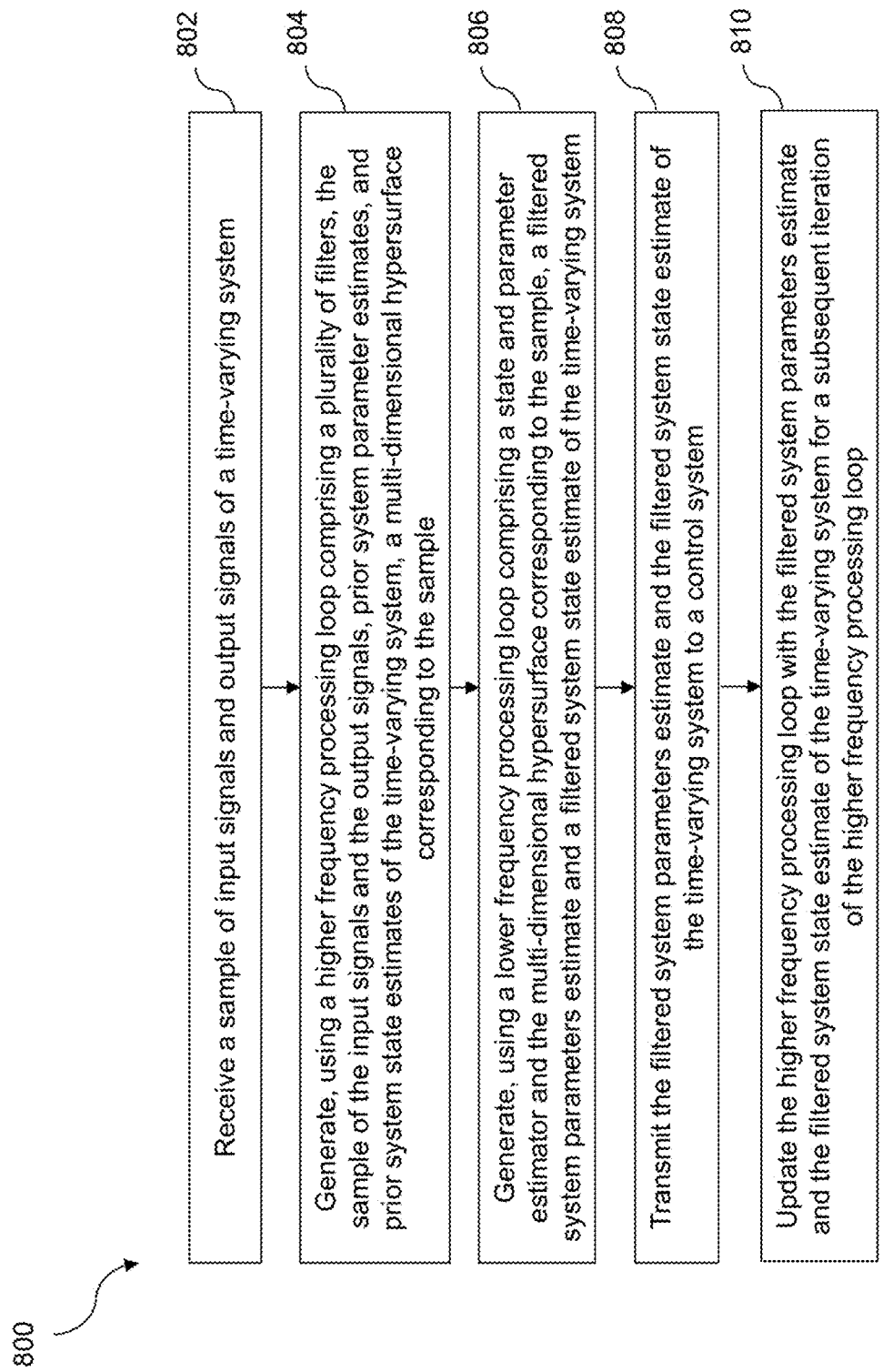
FIG. 8 is an example flowchart of a method for estimating state and parameters of a time-varying system, according to various aspects of the disclosure.

FIG. 8 is an example logic flow diagram illustrating a method of estimating the state and parameters of a time-varying system, according to some embodiments. One or more of the processes of method 800 may be implemented, at least in part, in the form of executable code stored on non-transitory, tangible, machine-readable media that when run by one or more processors may cause the one or more processors to perform one or more of the processes. In some embodiments, method 800 corresponds to the all or a portion of the operation of the adaptive state and parameter estimator 730 as depicted in FIG. 7 that performs prediction and estimation for the internal state and parameters of the time-varying system 105. Method 800 includes a number of enumerated steps, but aspects of the method 800 may include additional steps before, after, and in between the enumerated steps. In some aspects, one or more of the enumerated steps may be omitted, performed concurrently or performed in a different order. Further, Method 800 may be activated to operate as a loop while time-varying system 105 operates.

At step 802, a sample of input signals (e.g., 155 in FIGS. 1-4) and output signals (e.g., 160 in FIGS. 1-4) of a time-varying system (e.g., 105 in FIGS. 1-3) are received at adaptive state and parameter estimator 130 via an interface. The transmission of signals may be in real-time. The transmission may also be at predefined time increments to conserve network bandwidth. The transmission may also include only system input, only system output, or a combination of both. The transmission received over a predefined time increment may be referred to as a sample.

At step 804, a multi-dimensional hypersurface(e.g., objects {v(•)} 260 in FIGS. 2-3) corresponding to the sample is generated. As discussed above, the multi-dimensional hypersurface is generated based on the system output y 160 and system input u 150 and prior filtered estimated system state 270 and prior filtered estimated system parameters 245 that were generated during a previous iteration of the adaptive state and parameter estimator 130. As also discussed above, the aggregated sequence data in a multi-dimensional hypersurface may be generated using HFIL 220 that includes filters 205A-C. The filters 205A-C operate concurrently, such that each filter adapts one estimated system parameter, e.g., an $i^{th}$ filter adapts the $i^{th}$ estimated system parameter $\hat{q}_i(•)$ in $\hat{q}_i(•)= [\hat{q}_1(•), \hat{q}_2(•), \ldots, \hat{q}_i(•), \ldots, \hat{q}_N(•)]$ and holds other components of the estimated system parameter $\hat{q}_i(•)$ constant. As discussed above, the HFIL 220 filter may operate at a higher frequency(e.g., a frequency that is several multiple times higher) than the frequency of the LFOL 225.

At step 806, the filtered system parameters estimate and a filtered system state estimate of the time-varying system (e.g., 265 and 275 in FIG. 2) of the time-varying system are generated based on the aggregated sequence data in the multi-dimensional hypersurface. As discussed above, LFOL 225 may generate the filtered system parameters estimate and a filtered system state estimate of the time-varying system based on the aggregated sequence data in the multi-dimensional hypersurface.

At step 808, the filtered system parameters estimate and the filtered system state estimate of the time-varying system are transmitted to a control system (e.g., 110 in FIG. 1). For example, adaptive state and parameter estimator 130 may transmit the filtered system parameters estimate and the filtered system state estimate of the time-varying system (e.g., 265 and 275 in FIG. 2) of the time-varying system to control system 110.

At step 810, the filtered system parameters estimate and the filtered system state estimate of the time-varying system are used to update the HFIL 220 updated. For example, state and parameter updater 215 may update the prior filtered estimated system state 270 and prior filtered estimated system parameters 245 with the filtered system parameters estimate and the filtered system state estimate(e.g., 265 and 275 in FIG. 2). The state and parameter updater 215 may then feed the updated filtered estimated system state 270 and updated filtered estimated system parameters 245 to the HFIL 220 to determine the aggregated sequence data in the multi-dimensional hypersurface(e.g., objects {v(•)} 260 in step 804 (not shown).

Figure 9:
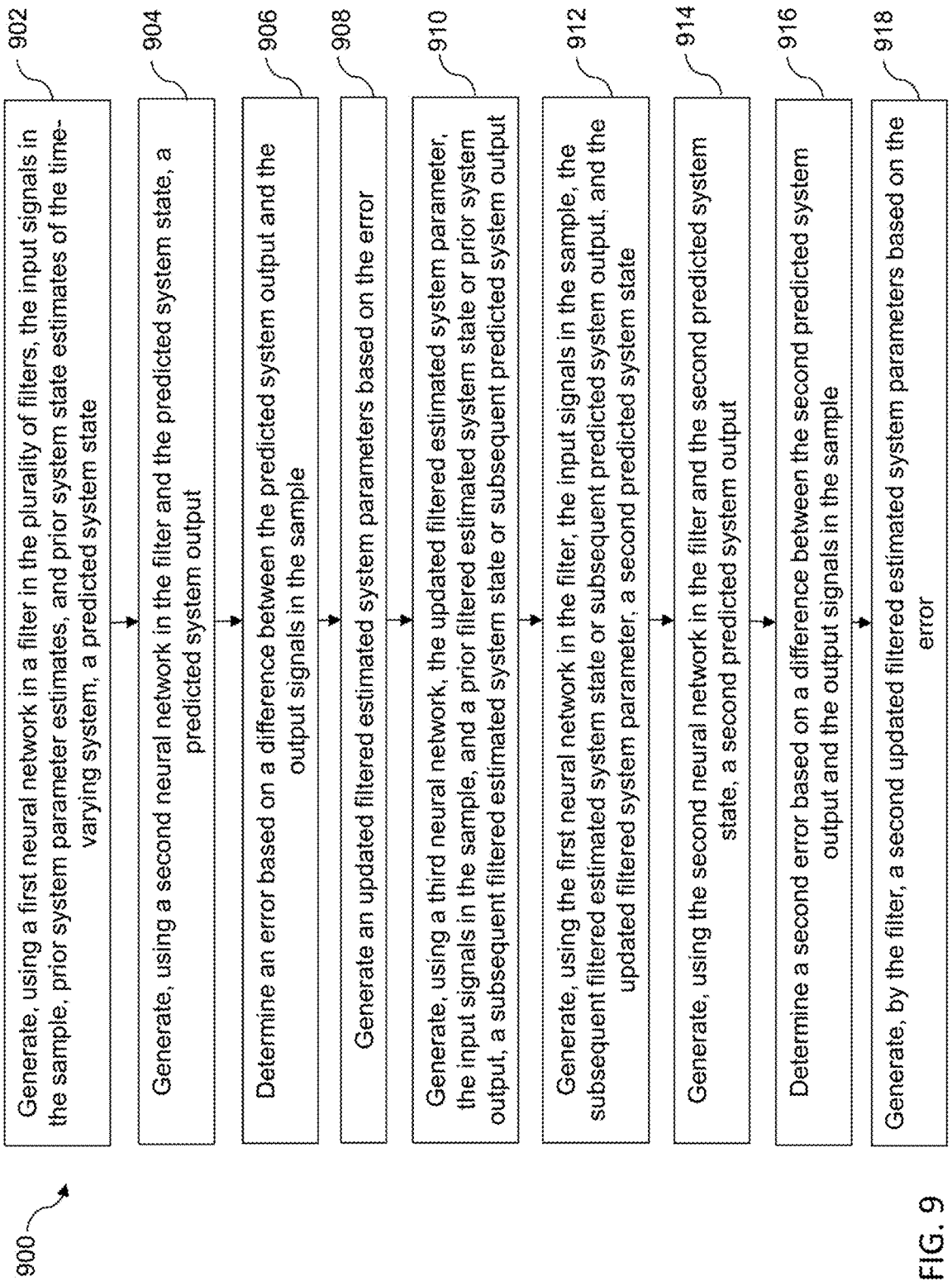
FIG. 9 is an example flowchart of a filtering process in a filter of a high frequency processing loop, according to various aspects of the disclosure.

FIG. 9 is an example logic flow diagram illustrating a filtering process, according to some embodiments. One or more of the processes of method 900 may be implemented, at least in part, in the form of executable code stored on non-transitory, tangible, machine-readable media that when run by one or more processors may cause the one or more processors to perform one or more of the processes. In some embodiments, method 900 corresponds to the all or a portion of the operation of the adaptive state and parameter estimator 130, 730 depicted in FIGS. 1 and 7 that performs prediction and estimation for the internal state and parameters of the time-varying system 105. Method 900 includes a number of enumerated steps, but aspects of the method 900 may include additional steps before, after, and in between the enumerated steps. In some aspects, one or more of the enumerated steps may be omitted, performed concurrently, or performed in a different order. FIG. 9 illustrates how a filter in filters 205A-C generates an object {$v_i$(•)} in objects {v(•)} 260 that is in included in the multi-dimensional hypersurface.

At step 902, a first neural network (e.g., 410A in FIG. 4) in a filter (e.g., one of 205A-C in FIG. 3) in the plurality of filters (e.g., 205A-C in FIG. 3) generates a predicted system state(e.g., 442 in FIG. 4) from an input signals (e.g., 155 in FIG. 4) in a sample, prior system parameter estimates, and prior system state estimates of the time-varying system (e.g., 270 and 265 from an earlier iteration of the LFPL 225). When the first neural network is configured as described in FIG. 5B, then 442 and 265 may refer to predicted system outputs and prior system output estimates, $\hat{y}_i(•)$, respectively.

At step 904, a second neural network in the filter generates a predicted system output from the predicted system state. As described above, neural network output estimator ($h_{NN}$) 415 may receive the predicted system state $\hat{x}_i(•)$ 442 as input and generate an output that is the predicted system output $\hat{y}_i(•)$ 435. When the first neural network is configured as described in FIG. 5B, then 415 may be omitted.

At step 906, an error is determined based on the difference between the predicted system output and the output signals in the sample. For example, as described above, an output prediction error e(•) 255 is computed by filter 405 from predicted system output ŷ(•) 435 and system output, i.e., output signals in the sample, y(•) 160.

At step 908, an updated filtered estimated system parameter is generated from the error. For example, as described above, function module 420 may generate a smoothed estimated system parameter 445F based on the output prediction errors e(•) 255. The smoothed estimated system parameter 445F may be the best estimate of an updated filtered estimated system parameter $\hat{q}_i(•)$ 445.

At step 910, a third neural network generates a subsequent filtered estimated system state or subsequent predicted system output. As described above, a third neural network 410B generates a subsequent filtered estimated system state 440 based on the updated filtered estimated system parameter 445, the input signals in the sample 155, and a prior filtered estimated system state, e.g., 440 from an earlier time step. Third neural network 410B may also generate subsequent predicted system output when third neural network is configured as described in FIG. 5B.

At step 912, the first neural network (e.g., 410A) in the filter (e.g., one of 205A-C in FIG. 3) generates a second predicted system state(e.g., 442 in FIG. 4) from the input signals (e.g., 155 in FIG. 4) in a sample, the subsequent filtered estimated system state 440 or subsequent predicted system output (e.g., 435, $\hat{y}_i(•)$, replaces 442 when the third neural network 410B is configured as described in FIG. 5B), and the updated filtered estimated system parameter 445A, i.e., 445 shifted by block 425. At a subsequent timestep, as discussed above, the system state $\hat{x}_i(•)$ 442 may be predicted from the system input u(•) 155, the filtered estimated system state 440 from an earlier time step, and updated filtered estimated system parameters 445A, by a first neural network 410A. For example, as described above, neural network state predictor 410A may receive u(•) 155 and generate an output that is the predicted system state $\hat{x}_i(•)$ 442 for time step k. As discussed above, the predicted system state $\hat{x}_i(•)$ 442 depends on the filtered estimated system parameters 445A determined at the previous timestep, k−1.

At step 914, the second neural network in the filter generates a predicted system output from the second predicted system state. For example, for the subsequent timestep, the second predicted system output $\dot{y}_i(\cdot)$ 435 is generated by a second neural network 415 in filter 405 from the second predicted system state $\hat{x}_i(\cdot)$ 442. As described above, neural network output estimator ($h_{NN}$) 415 may receive the second predicted system state $\hat{x}_i(\cdot)$ 442 as input and generate an output that is the second predicted system output $\hat{y}_i(\cdot)$ 435. When the first neural network is configured as described in FIG. 5B, then 415 may be omitted.

At step 916, an error is determined based on the difference between the second predicted system output and the output signals in the sample. For example, for the subsequent timestep, as described above, an output prediction error $e(\cdot)$ 255 is computed by filter 405 from second predicted system output $\hat{y}(\cdot)$ 435 and system output $y(\cdot)$ 160.

At step 918, a second updated filtered estimated system parameters is generated based on the error. For example, for the subsequent timestep, as described above, function module 420 may generate a smoothed estimated system parameter 445F, which may be the best estimate of second updated filtered estimated system parameter $\hat{q}_i(\cdot)$ 445 from the error $e(\cdot)$ 255. As also described above function module 420 may be in the filter 205A-C of the multiple filter system 205.

Figure 10:
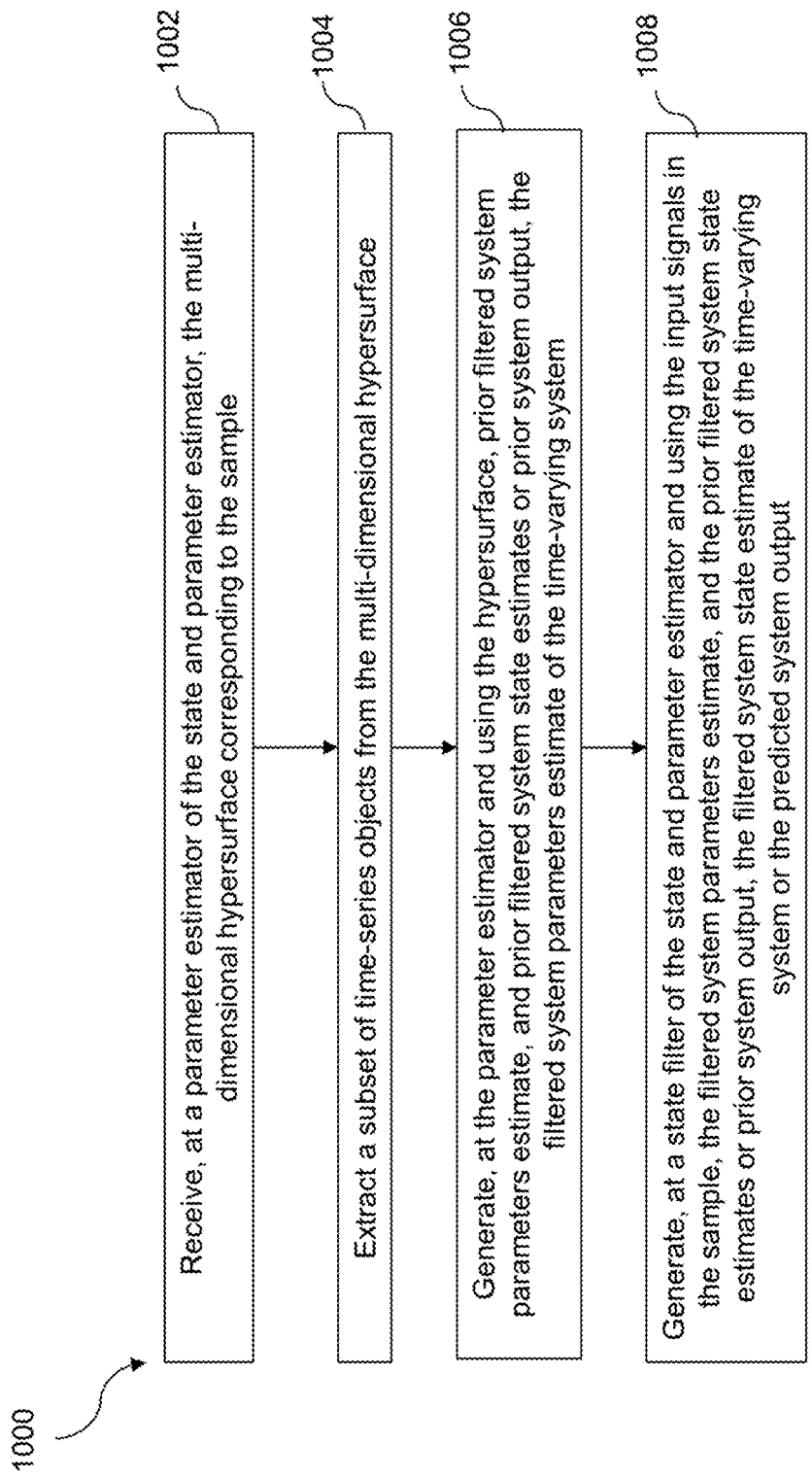
FIG. 10 is an example flowchart of a lower frequency processing loop, according to various aspects of the disclosure.

FIG. 10 is an example logic flow diagram illustrating an LFOL process, according to some embodiments. One or more of the processes of method 1000 may be implemented, at least in part, in the form of executable code stored on non-transitory, tangible, machine-readable media that when run by one or more processors may cause the one or more processors to perform one or more of the processes. In some embodiments, method 1000 corresponds to all or a portion of the operation of the adaptive state and parameter estimator 130, 730 depicted in FIGS. 1 and 7 that performs prediction and estimation for the internal state and parameters of the time-varying system 105. Method 1000 includes a number of enumerated steps, but aspects of the method 1000 may include additional steps before, after, and in between the enumerated steps. In some aspects, one or more of the enumerated steps may be omitted, performed concurrently, or performed in a different order.

At step 1002, a multi-dimensional hypersurface that includes time series objects is received from HFIL 220 at a parameter estimator 610 of the state and parameter estimator 210. For example, the multi-dimensional hypersurface that includes time series objects $\{v(\cdot)\}$ 260 may be received at the state and parameter estimator 210 included in the LFOL 225.

At step 1004, a subset of time series objects in the multi-dimensional hypersurface $\{v_i(\cdot)\}$ 260 is extracted by a sampling function in state and parameter estimator 210. For example, as described above with respect to FIG. 2, the Sample( ) function may be used to extract a subset of the time series objects $\{v(\cdot)\}$ 260 in the state and parameter estimator 210.

At step 1006, the parameter estimator generates filtered system parameters estimate of the time-varying system from the subset of time series objects. For example, a neural network in the parameter estimator 610 may generate smoothed system parameter estimate $\hat{q}(k|k+1)$ 625, which is also the best estimate of the filtered system parameters estimate $\hat{q}(k+1|k+1)$ 265, from subset of the time series objects $\{v(\cdot)\}$ 260, the filtered system parameters estimate $\hat{q}(k|k)$ from an earlier time step, and the filtered system state estimates $\hat{x}(k|k)$ or prior system output $y(k)$ 160 from an earlier time step k. The filtered system parameters estimate $\hat{q}(k|k)$ may be equal to filtered system parameters $\hat{q}(k|k+1)$ 625 that parameter estimator 610 generated in a previous time step. The filtered system state estimate $\hat{x}(k|k)$ may be the filtered system state estimates $\hat{x}(k+1|k+1)$ 275 that the state filter 620 generated during a previous time step k.

At step 1008, a state filter of the state and parameter estimator generates a filtered system state estimate or a predicted system output (e.g., as described in FIG. 5B). For example, a neural network in state filter 620 receives filtered system parameters estimate $\hat{q}(k|k+1)$ 625, system input $u(k)$ 155 and the filtered system state estimate $\hat{x}(k|k)$ or prior system output $y(k)$ 160, which may be the filtered state estimates $\hat{x}(k+1|k+1)$ 275 that the state filter 620 generated during a previous time step k.

Figure 11:
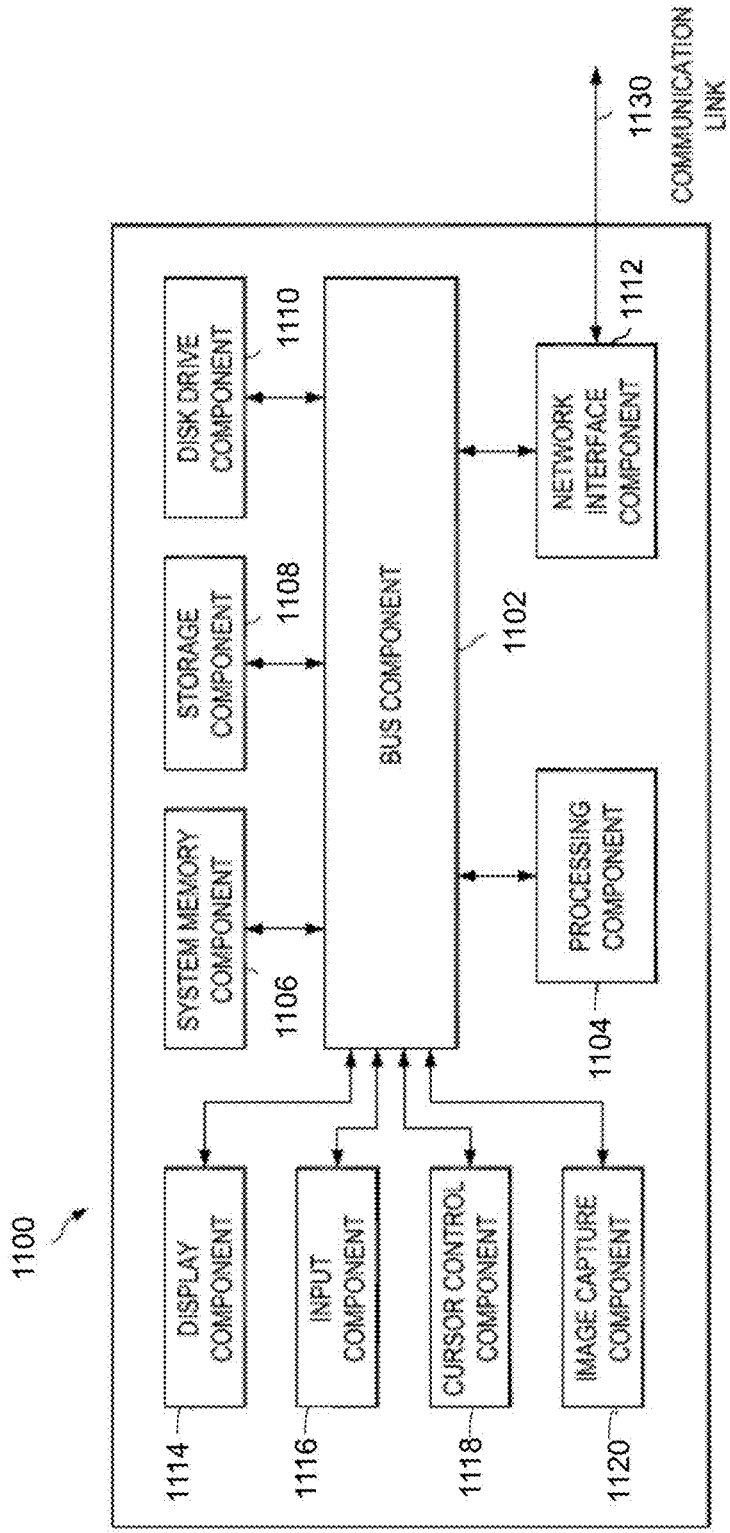
FIG. 11 is a block diagram of a computer system suitable for implementing various methods and devices, according to various aspects of the disclosure.

FIG. 11 is a block diagram of a computer system 1100 suitable for implementing various methods and devices described herein. In various implementations, the devices capable of performing the steps may comprise a network communications device(e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the adaptive state and parameter estimator 130 and the various method steps of the method 800-1000 discussed above may be implemented as the computer system 1100.

In accordance with various aspects of the present disclosure, the computer system 1100, such as a network server or a mobile communications device, includes a bus component 1102 or other communication mechanisms for communicating information, which interconnects subsystems and components, such as a computer processing component 1104 (e.g., processor, micro-controller, digital signal processor (DSP), etc.), system memory component 1106 (e.g., RAM), static storage component 1108 (e.g., ROM), disk drive component 1110 (e.g., magnetic or optical), network interface component 1112 (e.g., modem or Ethernet card), display component 1114 (e.g., cathode ray tube(CRT) or liquid crystal display(LCD)), input component 1116 (e.g., keyboard), cursor control component 1118 (e.g., mouse or trackball), and image capture component 1120 (e.g., analog or digital camera). In one implementation, disk drive component 1110 may comprise a database having one or more disk drive components.

In accordance with aspects of the present disclosure, computer system 1100 performs specific operations by the processing component 1104 executing one or more sequences of one or more instructions contained in system memory component 1106. Such instructions may be read into system memory component 1106 from another computer readable medium, such as static storage component 1108 or disk drive component 1110. In other aspects, hard-wired circuitry may be used in place of (or in combination with) software instructions to implement the present disclosure. In some aspects, the various components of the adaptive state and parameter estimator 130 may be in the form of software instructions that can be executed by the processing component 1104 to automatically perform context-appropriate tasks on behalf of a user.

Logic may be encoded in a computer readable medium, which may refer to any medium that participates in providing instructions to the processing component 1104 for execution. Such a medium may take many forms, including but not limited to, non-volatile media and volatile media. In one aspect, the computer readable medium is non-transitory. In various implementations, non-volatile media includes optical or magnetic disks, such as disk drive component 1110, and volatile media includes dynamic memory, such as system memory component 1106. In one aspect, data and information related to execution instructions may be transmitted to computer system 1100 via a transmission media, such as in the form of acoustic or light waves, including those generated during radio wave and infrared data communications. In various implementations, transmission media may include coaxial cables, copper wire, and fiber optics, including wires that comprise bus 1102.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the adaptive state and parameter estimator 130 discussed above.

In various aspects of the present disclosure, execution of instruction sequences to practice the present disclosure may be performed by computer system 1100. In various other aspects of the present disclosure, a plurality of computer systems 1100 coupled by communication link 1130 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 1100 may transmit and receive messages, data, information and instructions, including one or more programs (i.e., application code) through communication link 1130 and network interface component 1112. Received program code may be executed by processing component 1104 as received and/or stored in disk drive component 1110 or some other non-volatile storage component for execution. The communication link 1130 and/or the network interface component 1112 may be used to conduct electronic communications between the adaptive state and parameter estimator 130 and external devices, for example with the user device 710 depending on exactly where the adaptive state and parameter estimator 130 is implemented.

Figure 12:
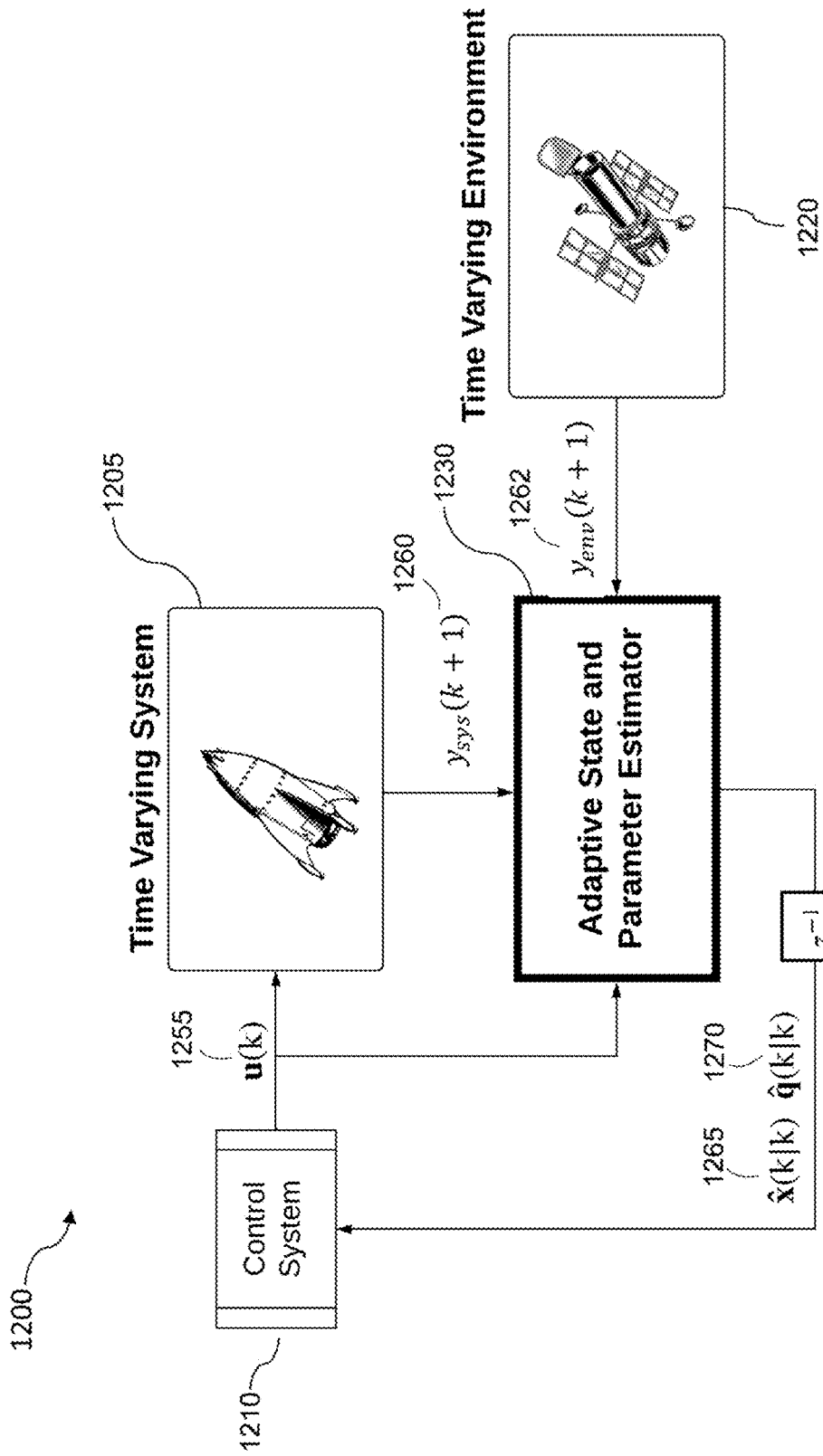
FIG. 12 is a block diagram of an autonomous navigation system for a time-varying system, according to various aspects of the disclosure.
Figure 13:
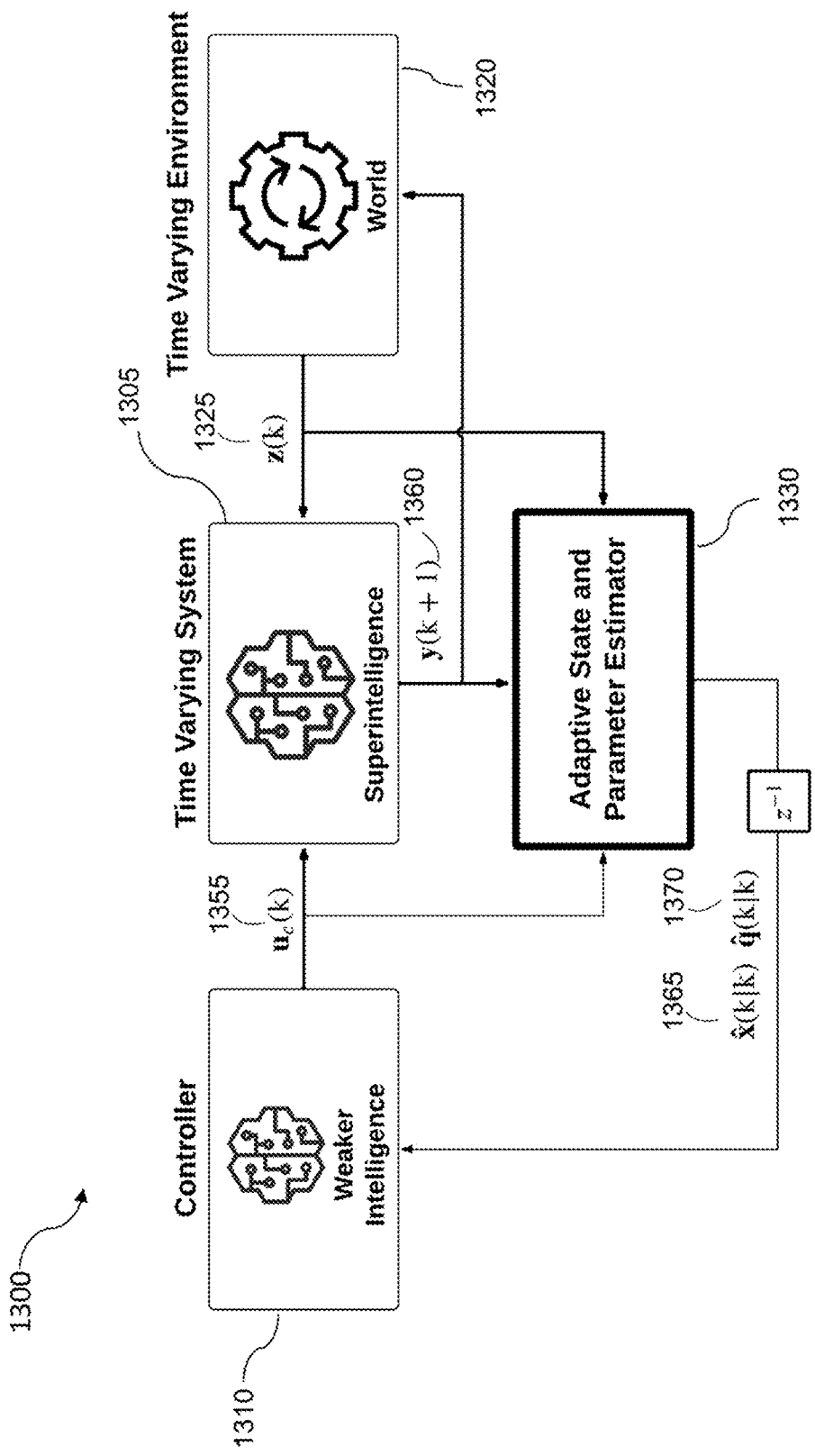
FIG. 13 is a block diagram of an artificial intelligence superalignment system for a time-varying artificial intelligence, according to various aspects of the disclosure.

FIGS. 12-13 are block diagrams of non-limiting example implementations of the aspects of the disclosure. FIGS. 12-13 illustrate example implementations supporting autonomous navigation and the control of artificial intelligence.

FIG. 12 is a block diagram of autonomous navigation system for a time-varying system of systems, according to various aspects of the disclosure. FIG. 12 illustrates an environment 1200 that may be characterized as a system of systems, where the interaction of multiple systems, which may be uncoupled, or loosely coupled, may be guided toward an optimized collaboration by the control system. The environment 1200 may include a time-varying system 1205, a specific scope time-varying environment 1220 of interest, a control system 1210, and adaptive state and parameter estimator 1230, all of which may be implemented in hardware, software, or a combination thereof.

The adaptive state and parameter estimator 1230 includes sufficient mechanical and electronic capability for information reception, transmission, and transformation to support the interaction with the rest of the environment 1200. The adaptive state and parameter estimator 1230 may receive system input/control message 1255, system output 1260, and environment output 1262. In some embodiments, the total system output may be defined, $y=[y_{sys}, y_{env}]$, i.e., the outputs of the system and environment may be concatenated. As described herein, the adaptive state and parameter estimator 1230 may estimate certain parameters 1270 and states 1265 of a time-varying system 1205 and inform the control system 1210 of the parameters and states from which to base its control responses to achieve its objectives. In a non-limiting embodiment, the time-varying system 1205 and the specific-scope time-varying environment 1220 of interest may include a stochastic nonlinear dynamical system, such as a space propulsion system, an outer space environment (comprising e.g., stars, planets, spacecraft, and gravitational fields), an external collision threat, an artificial intelligence, a quantum computer, an autonomous vehicle, a populous urban environment, or other systems and environments. In a non-limiting embodiment, the control system 1210 may be a control system, a detection system, or a decision system. Adaptive state and parameter estimator 1230 may have similar structure to similarly named components described herein, e.g., adaptive state and parameter estimator 130. In some embodiments, system outputs 1260, 1262 of the time-varying system 1205 and time-varying environment 1220 may also be provided to the control system 1210.

FIG. 13 is a block diagram of an artificial intelligence superalignment system for a time-varying artificial intelligence, according to aspects of the disclosure. FIG. 13 illustrates an environment 1300 where the control of a time-varying strong artificial intelligence 1305 via weak artificial intelligence 1310 may be performed. The environment 1300 includes a time-varying artificial superintelligence 1305, an artificial intelligence 1310 that asserts control, a certain domain of a time-varying environment 1320 that is affected by the artificial superintelligence 1305 (e.g., through the artificial superintelligence's output 1360) and that provides feedback 1325 to the artificial superintelligence 1305, and an adaptive state and parameter estimator 1330, all of which may be implemented in hardware, software, or a combination thereof. In some embodiments, the system input may be defined, $u=[u_c, z]$, i.e., the control response/message 1355 and the output/feedback 1325 from the time-varying environment 1320 may be concatenated.

The adaptive state and parameter estimator 1330 includes sufficient mechanical and electronic capability for information reception, transmission, and transformation to support the interaction with the rest of the environment 1300. The adaptive state and parameter estimator 1330 may receive system input/control responses 1355, system output 1360, and environment output/feedback 1325. The adaptive state and parameter estimator 1330 may estimate certain parameters 1370 and states 1365 of a time-varying artificial superintelligence 1305 and of the certain domain of the time-varying environment 1320 and inform the weaker artificial intelligence 1310 (which performs the functions of a control system) of the parameters and states from which to update its implicit or explicit reference models concerning the interacting systems (e.g., artificial superintelligence 1305 and time varying environment 1320) and to base its control responses 1355 to achieve its objectives. In a non-limiting embodiment, the time-varying artificial superintelligence 1305 and the specific-domain time-varying environment 1320 of interest may have stochastic nonlinear dynamical system behaviors and the specific-domain time-varying environment of interest may be a general public, a swarm of robots, a space propulsion system, an outer space environment, an external collision threat, an artificial intelligence, a quantum computer, an autonomous vehicle, a natural system, a biological system, a populous urban environment, or other system. In a non-limiting embodiment, the artificial intelligence system 1310 may be a control system, a detection system, or a decision system. Adaptive state and parameter estimator 1330 may have similar structure to similarly named components described herein, e.g., adaptive state and parameter estimator 130. In some embodiments, output 1360 and feedback 1325 of the time-varying system 1305 and time-varying environment 1320, respectively, may also be provided to the control system 1310.

FIGS. 14-17 are block diagrams that provide non-limiting example implementations of the disclosure for distributed systems. Because of the scale and complexity of many time-varying systems, practical deployments, costs, sustainability, maintenance, and other metrics may be optimized by such distributed support that is depicted in FIGS. 14-17.

Figure 14:
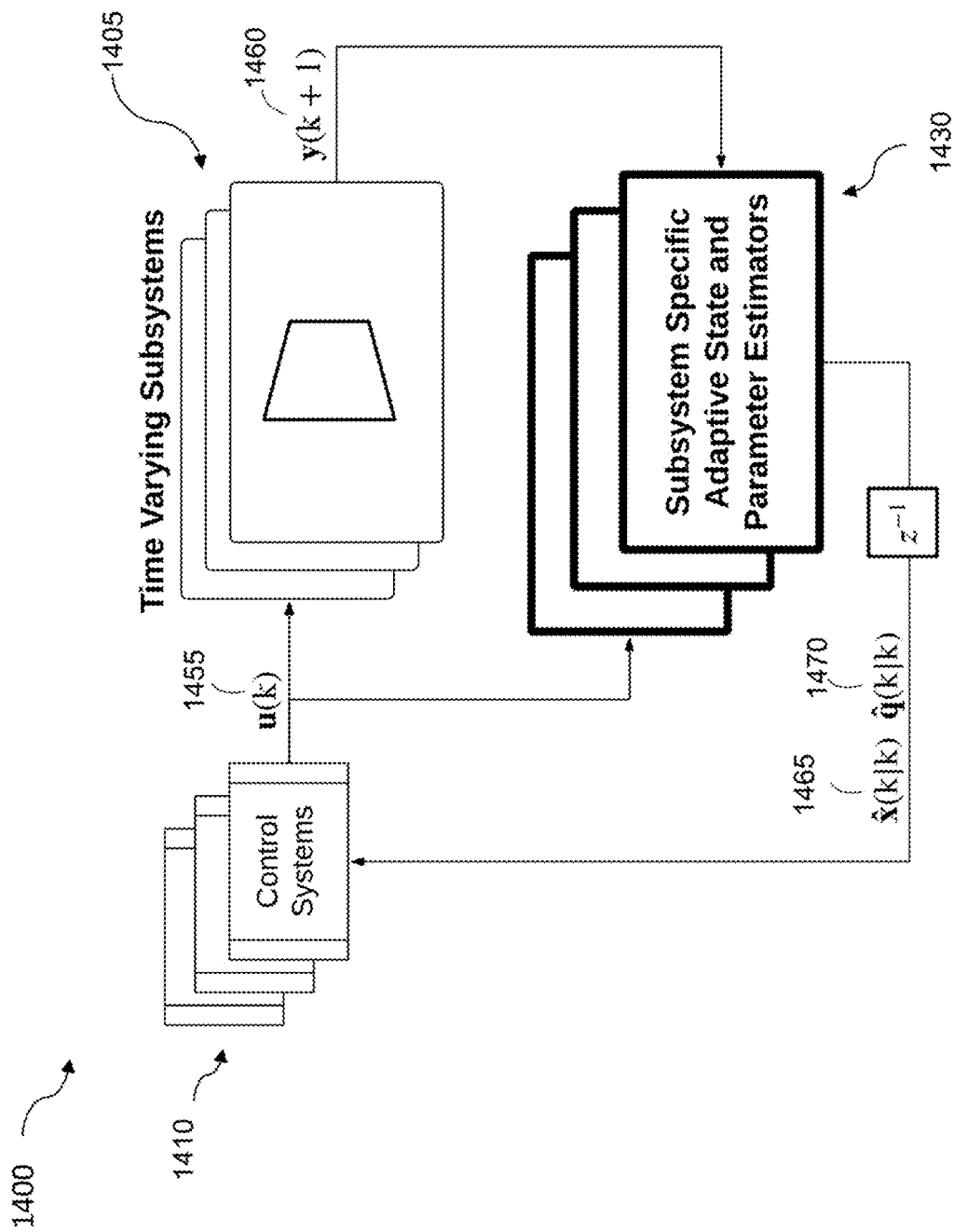
FIG. 14 is a block diagram of a time-varying distributed system composed of a plurality of time-varying subsystems with subsystem specific adaptive state and parameter estimators, according to various aspects of the disclosure.

FIG. 14 is a block diagram of a time-varying distributed system composed of a plurality of time-varying subsystems with subsystem specific adaptive state and parameter estimators, according to various aspects of the disclosure. FIG. 14 illustrates an environment 1400. The environment 1400 includes a plurality of time-varying interrelated subsystems 1405, a plurality of control systems 1410, and a distribution of adaptive state and parameter estimators 1430, all of which may be implemented in hardware, software, or a combination thereof. There may be any number of control systems, time-varying subsystems, and subsystem-specific adaptive state and parameter estimators, along with any number if inputs and outputs associated therewith. As discussed below, an example of three subsystems is illustrated in FIGS. 15A-B, and 16.

The subsystem-specific adaptive state and parameter estimators 1430 include sufficient mechanical and electronic capability for information reception, transmission, and transformation to support the interaction with the rest of the environment 1400. Each of the subsystem-specific adaptive state and parameter estimators 1430 may receive system input/control responses 1455 and the associated subsystem-specific output 1460. The subsystem-specific adaptive state and parameter estimators 1430 may estimate certain parameters and states of a time-varying subsystem 1405 and inform the appropriate control system 1410 of the correct parameters 1470 and states 1465 from which to base its control responses 1455 to achieve its objectives. In a non-limiting embodiment, the time-varying subsystem 1405 may be a stochastic nonlinear dynamical system, such as a turbine, a pipeline, a motor, a microprocessor, a tank, a heart, a lung, a microbe, a natural environment, or a sensor. In a non-limiting embodiment, the control system may be a control system, a detection system, or a decision system. Each of the subsystem-specific adaptive state and parameter estimators 1430 may have similar structure to similarly named components described herein, e.g., adaptive state and parameter estimator 130. In some embodiments, output 1460 of one or more of the time-varying subsystems 1405 may be provided to one or more of the control systems 1410.

Figure 15A:
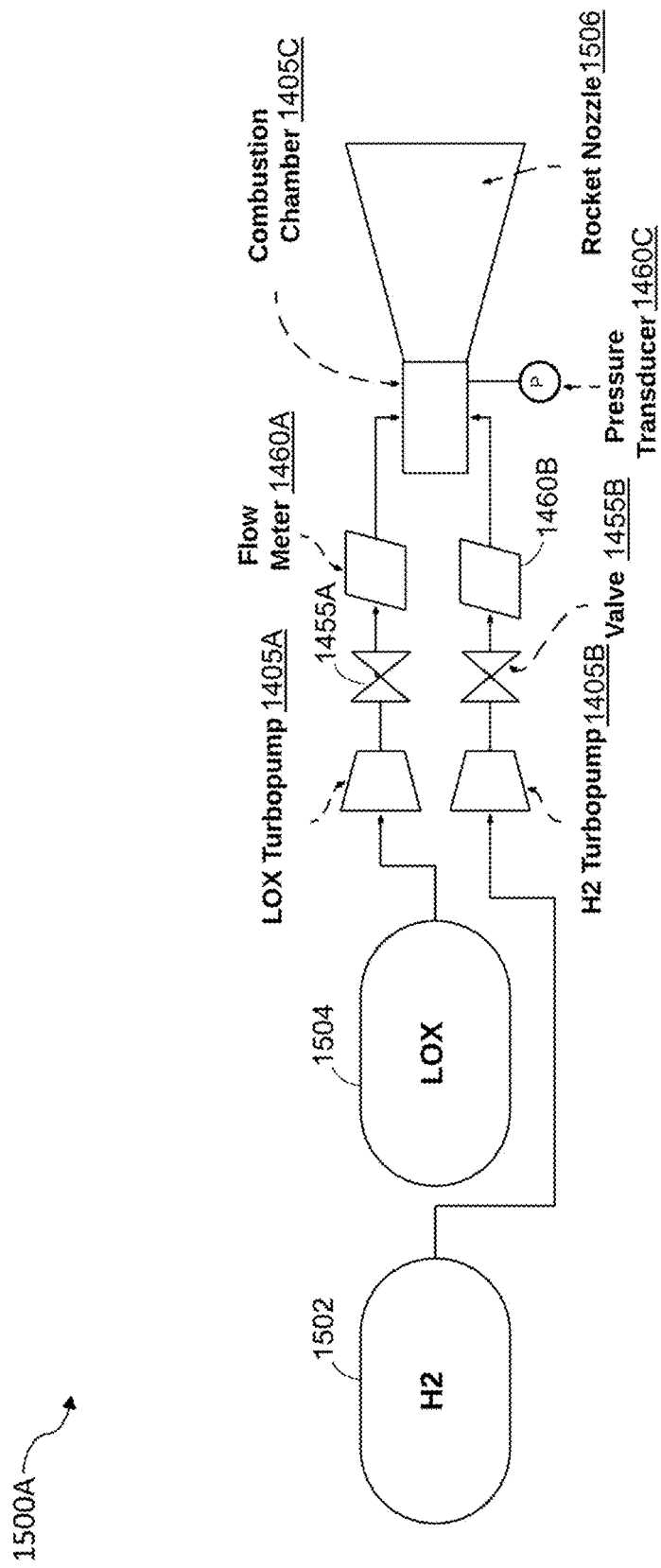
FIG. 15A is a simplified schematic block diagram of liquid propulsion rocket engine, according to various aspects of the disclosure.
Figure 15B:
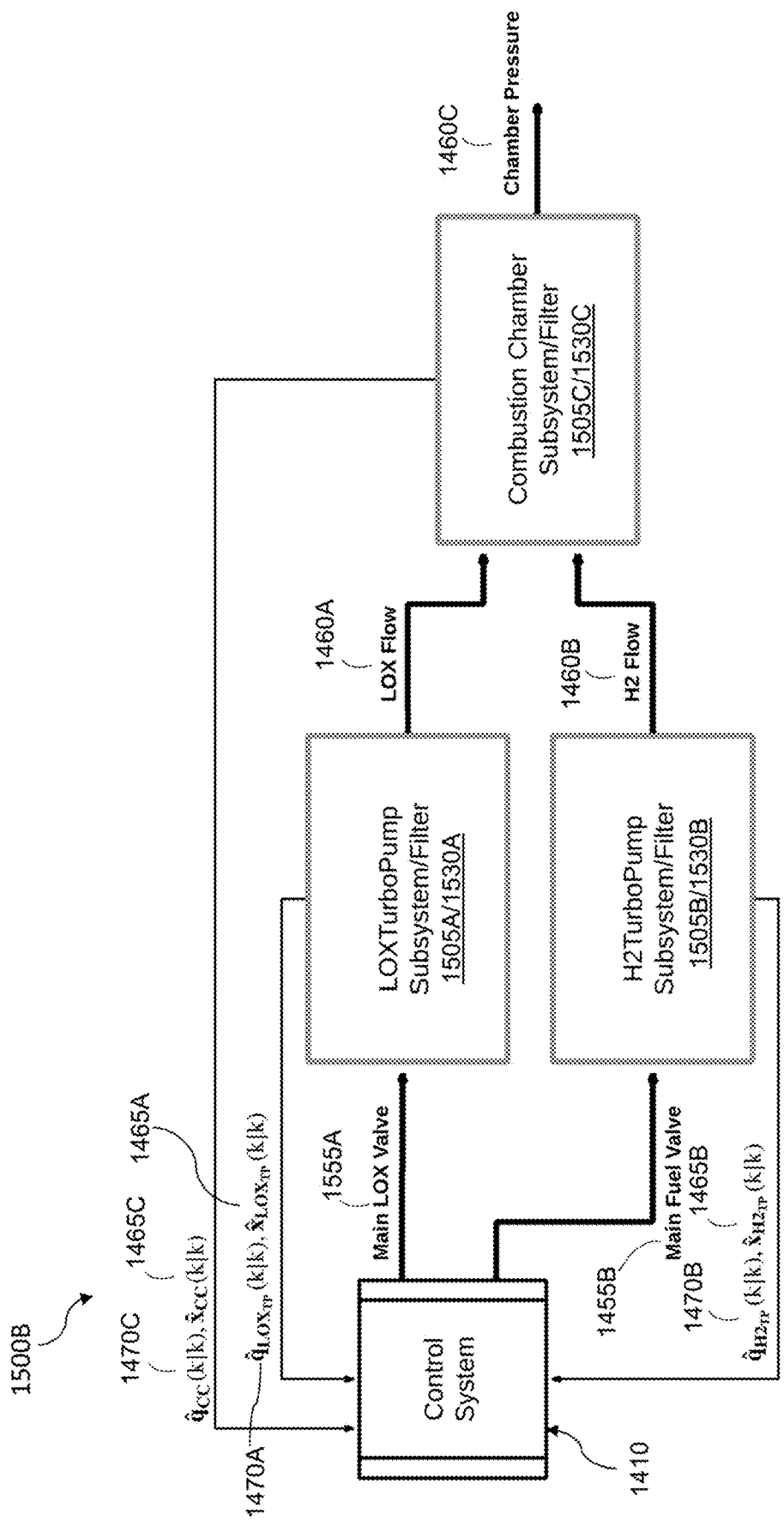
FIG. 15B is a block diagram of an example time-varying liquid propulsion rocket engine comprising several interrelated time-varying subsystems, according to various aspects of the disclosure.
Figure 16:
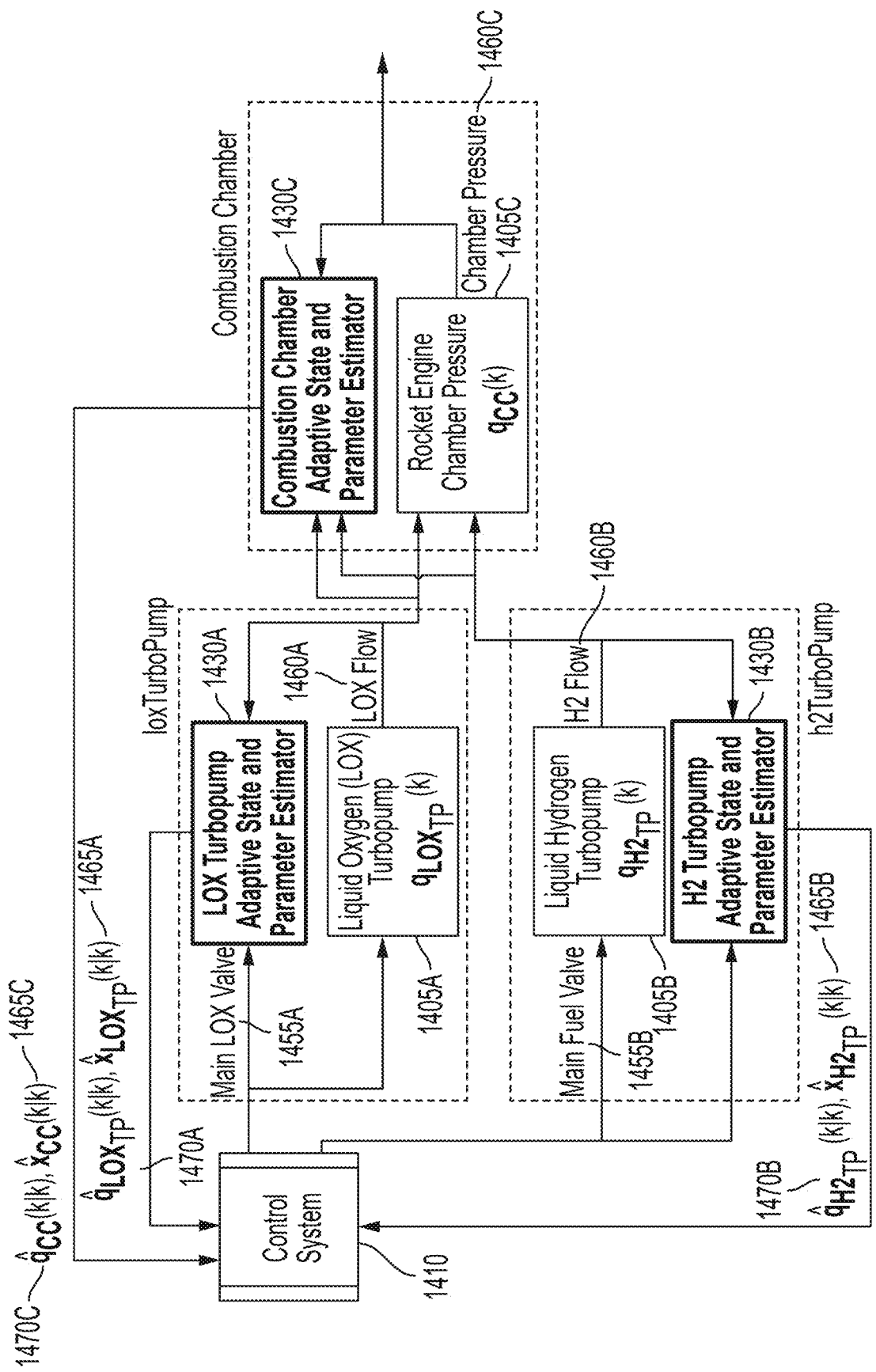
FIG. 16 is a block diagram of the example time-varying liquid propulsion rocket engine of FIG. 15B including adaptive state and parameter estimators for interrelated time-varying subsystems of the liquid propulsion rock engine, according to various aspects of the disclosure.

FIGS. 15A-B illustrate a distributed embodiment, according to aspects of the present disclosure concerning a simplified diagram of a liquid propulsion rocket engine 1500A (LPRE). FIG. 15A is a simplified schematic block diagram of liquid propulsion rocket engine 1500A. FIG. 15A shows that LPRE diagram includes three time-varying subsystems of interest (the liquid oxygen (LOX) turbopump 1405A, the liquid hydrogen (LH2) turbopump 1405B, and the combustion chamber 1405C), three system outputs (the LOX flow via its flow meter 1460A, the LH2 flow via its flow meter 1460B, and the chamber pressure via a pressure transducer 1460C), and two control inputs (the LOX valve position 1455A and the LH2 valve position 1455B). Additionally, the liquid hydrogen tank 1502, liquid oxygen tank 1504, and rocket nozzle 1506 are depicted.

FIG. 15B is a block diagram of an example time-varying liquid propulsion rocket engine 1500B comprising several interrelated time-varying subsystems, according to various aspects of the disclosure. In FIG. 15B, a controller block 1410 provides control inputs 1455A, 1455B to the Subsystem/Filter blocks representing the LOX turbopump 1405A and LOX turbopump filter 1430A and the LH2 Turbopump 1405B and LH2 turbopump filter 1430B. The LOX Turbopump block accepts Main LOX Valve position input 1455A from the controller 1410 and outputs the sensed LOX flow 1460A (from the LOX flow meter) and the estimated parameters 1470A and states 1465A of the LOX turbopump 1405A. The LH2 Turbopump block accepts Main LH2 Valve position input 1455B from the controller 1410 and outputs the sensed LH2 flow 1460B (from the LH2 flow meter) and the estimated parameters 1470B and states 1465B of the LH2 turbopump 1405B. The Combustion Chamber block accepts, as inputs, flow outputs, i.e., LOX flow 1460A and LH2 flow 1460B, and outputs the sensed chamber pressure 1460C (from the pressure transducer) and the estimated parameters 1470C and states 1465C of the combustion chamber 1405C. For all the Subsystem/Filter blocks, the estimated parameters 1470A-C and states 1465A-C are fed back to the control system 1410.

FIG. 16 is a block diagram of the example time-varying liquid propulsion rocket engine of FIG. 15B including adaptive state and parameter estimators 1430A-C for interrelated time-varying subsystems 1405A-C of the liquid propulsion rock engine 1500, according to various aspects of the disclosure. FIG. 16 expands on FIG. 15B, expanding the Subsystem/Filter blocks to reveal the distributed subsystem-specific adaptive state and parameter estimators 1430A-C. In each Subsystem/Filter block, the subsystem input 1455A-C and output 1460A-C is provided to its subsystem-specific adaptive state and parameter estimator 1430A-C to generate the state 1465A-C and parameter 1470A-C estimates (e.g., 1455A and 1460A provided to 1430A, which generates 1465A and 1470A) for provision to the control system 1410. In some embodiments, control system 1410 itself may be distributed between two or more separate, but possibly connected and/or interaction, control systems.

Figure 17:
FIG. 17 is an example pseudo code implementation of the adaptive control for a liquid propulsion rocket engine, according to various aspects of the disclosure.

FIG. 17 is a diagram 1700 of an example pseudo code implementation of the adaptive control for a liquid propulsion rocket engine, according to various aspects of the disclosure. The pseudo code implements the block diagram flow that is depicted in FIGS. 15B and 16. Pseudo code includes an instruction loop where the code repeats while the variable run is set to True. The pseudo code illustrates utilizing the disclosed methods in computer code implementations for monitoring and control of complex time-varying systems comprised of many interrelated time-varying subsystems, e.g., 1405A-C. In the pseudo code the Subsystem/Filter blocks 1405A-C/1430A-C are shown as functions that receive inputs and return outputs, e.g., inputs 1455A-B and outputs 1460A-B. The control system, e.g., 1410, implementation is also shown as a function that receives inputs and returns outputs, e.g., inputs 1465A-C and 1470A-C. The inputs and outputs of the functions are reflected in FIGS. 15A-B and 16. The functions may be comprised of other functions that perform specific tasks. As can be expected from FIG. 16, each function in FIG. 17 representing a specific Subsystem/Filter block may contain functions that provide the input information (arguments of the function) to the specific subsystem and that collect the outputs of the subsystem. Each Subsystem/Filter block function will also contain a function that represents the adaptive state and parameter estimator (e.g., 1430A-C) for the specific subsystem (e.g., 1405A-C).

The adaptive state and parameter estimators may be implemented in software, hardware, or a combination of both. In some embodiments, subsystem-specific adaptive state and parameter estimators may be easy to develop. The controllability and maintainability of software for subsystem-specific adaptive state and parameter estimators will be very high since the cost of development and tests for a given subsystem will be much cheaper than for a fully integrated complex system. Further, only the associated subsystem-specific estimator needs to be exchanged (or updated) with the exchange or update of hardware subsystems, thereby conserving development and testing costs and providing trackable systemization to the failure management of evolving complex nonlinear systems. Such failure management solution may be a substantial benefit to the development of reliably safe systems for aerospace, defense, nuclear energy, and oil exploration applications, to name a few.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. Additionally, like reference numerals denote like features throughout specification and drawings.

It should be appreciated that the blocks in each diagram or flowchart and combinations of the diagrams or flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each signaling diagram or flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction for performing the functions described in connection with a block(s) in each signaling diagram or flowchart. Since the computer program instructions may be equipped in a computer or other programmable data processing devices, instructions that generate a process executed by a computer as a series of operational steps are performed by the computer or other programmable data processing devices and operate the computer or other programmable data processing devices may provide steps for executing the functions described in connection with a block(s) in each signaling diagram or flowchart.

Each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

Where applicable, various aspects provided by the disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the adaptive state and parameter estimator 130 may be implemented as such software code.

Based on the above discussions, systems and methods described in the disclosure offer several significant advantages over conventional methods and systems. It is understood, however, that not all advantages are necessarily discussed in detail herein, different aspects may offer different advantages, and that no particular advantage is required for all aspects. One advantage is improved functionality of a computer. For example, conventional computer systems used as control systems, even with the benefit of machine learning, have not been able to implement control systems where the number independent equations is bounded by the number of relevant sensed outputs and exceeded by the number of potential degradation and failure events of interest. This is because conventional systems have not been able to process the enough data with enough equations in real time with available computing resources and memory in time-varying systems. The management system and adaptive state and parameter estimator as described in this disclosure makes this possible by generating information-rich hypersurfaces based on pre-trained neural networks.

The inventive ideas of the disclosure are also integrated into a practical application, for example into the adaptive state and parameter estimator 130 discussed above. Such a practical application can generate an output (estimated parameters of a time-varying system 105) that is easily understood by a human user or in a form receivable by a control system, and it is useful in many contexts.

It should be appreciated that like reference numerals are used to identify like elements illustrated in one or more of the figures, wherein these labeled figures are for purposes of illustrating aspects of the present disclosure and not for purposes of limiting the same.

The foregoing disclosure is not intended to limit the disclosure to the precise forms or particular fields of use disclosed. As such, it is contemplated that various alternate aspects and/or modifications to the disclosure, whether explicitly described or implied herein, are possible in light of the disclosure. Having thus described aspects of the disclosure, persons of ordinary skill in the art will recognize that changes may be made in form and detail without departing from the scope of the present disclosure. Thus, the disclosure is limited only by the claims.

What is claimed is:

1. A method for estimating state and parameters of a time-varying system, comprising:
   receiving, at a higher frequency processing loop, a sample of inputs and outputs of the time-varying system, wherein the inputs from the sample are from a control system and the outputs in the sample are sensor readings of the time-varying system;
   generating, in real-time and using at least one processor and the higher frequency processing loop comprising a plurality of filters stored in at least one memory, the sample of the inputs and the outputs, prior system parameters estimates of the time-varying system, and prior system state estimates of the time-varying system, a multi-dimensional hypersurface corresponding to the sample;
   generating, in real-time and using the at least one processor and a lower frequency processing loop comprising a state and parameter estimator and the multi-dimensional hypersurface corresponding to the sample stored in the at least one memory, a filtered system parameters estimate and a filtered system state estimate of the time-varying system;
   dynamically updating the control system with the filtered system parameters estimate and the filtered system state estimate of the time-varying system;
   generating, using the control system, the filtered system parameters estimate, and the filtered system state estimate of the time-varying system, a control response associated with updated inputs for the time-varying system; and
   controlling, by the control system, the time-varying system using the control response.

2. The method of claim 1, further comprising:
   updating the higher frequency processing loop with the filtered system parameters estimate and the filtered system state estimate of the time-varying system for a subsequent iteration of the higher frequency processing loop,
   wherein the filtered system parameters estimate and the filtered system state estimate of the time-varying system are prior system parameters estimates and prior system state estimates of the time-varying system for the subsequent iteration, and
   wherein the subsequent iteration of the higher frequency processing loop generates an updated multi-dimensional hypersurface corresponding to a new sample of inputs and outputs.

3. The method of claim 1, wherein the higher frequency processing loop operates at a frequency greater than or equal to the lower frequency processing loop.

4. The method of claim 1, wherein each filter in the plurality of filters in the higher frequency processing loop adapts a subset of the estimated system parameters from the prior estimated system parameters, wherein each subset of the estimated system parameters is different for the each filter, and wherein other prior estimated system parameters from the prior estimated system parameters not in the subset of the estimated system parameters for each filter are held constant at the each filter as the each filter determines time series objects for the multi-dimensional hypersurface, wherein the size of each subset of the estimated system parameters must be less than or equal to the size of a predicted system output generated by each filter.

5. The method of claim 1, wherein the multi-dimensional hypersurface comprises time series objects aggregated from the plurality of filters, wherein each time series object in the time series objects comprises one or more of sequence of prediction errors, sequence of filtered estimated system parameters, sequence of filtered estimated system states, gradients of an output prediction-error cost function, signal-to-noise ratio formulations of the gradients, and sequence of system outputs.

6. The method of claim 1, further comprising:
   generating, using at least one neural network in a filter in the plurality of filters, the inputs in the sample, prior system parameters estimates, and at least one of the prior system state estimates, prior system predicted outputs, or prior system outputs of the time-varying system, a predicted system output;
   determining an error based on a difference between the predicted system output and the outputs in the sample;
   generating an updated filtered estimated system parameter based on the error; and
   generating, using the at least one neural network, the updated filtered estimated system parameter, the inputs in the sample, and a prior filtered estimated system state or prior system output, a subsequent filtered estimated system state or subsequent predicted system output.

7. The method of claim 6, further comprising:
   generating, using the at least one neural network in the filter, the inputs in the sample, the subsequent filtered estimated system state or subsequent predicted system output, and the updated filtered system parameter, a second predicted system output;
   determining a second error based on a difference between the second predicted system output and the outputs in the sample; and
   generating, by the filter, a second updated filtered estimated system parameter based on the error.

8. The method of claim 6, further comprising:
   training the at least one neural network using a training dataset comprising system input, system parameters, and at least one of a system output and system state.

9. The method of claim 1, further comprising:
   receiving, at a parameter estimator of the state and parameter estimator, the multi-dimensional hypersurface corresponding to the sample;

generating, at the parameter estimator and using the hypersurface, prior filtered system parameters estimate, and at least one of prior filtered system state estimates or prior system output, the filtered system parameters estimate of the time-varying system; and generating, at a state filter of the state and parameter estimator and using at least one of the inputs in the sample, the filtered system parameters estimate, or the prior filtered system state estimates, and the prior system output, the filtered system state estimate of the time-varying system or a predicted system output.

10. The method of claim 9, further comprising:
sampling a subset of time-series objects in the multi-dimensional hypersurface; and
wherein the generating the filtered system parameters estimate is based on the subset of time-series objects.

11. The method of claim 9, wherein the state and parameter estimator comprises a neural network, and further comprising:
training the neural network using a data set comprising time-series objects for training, and at least one of known training system parameters, known training system states, known training system outputs, and known training system inputs.

12. A system, comprising:
a non-transitory memory; and
one or more hardware processors coupled to the non-transitory memory and configured to read instructions from the non-transitory memory to cause the system to perform operations comprising:
receiving, at a higher frequency processing loop, a sample of inputs and outputs of a time-varying system, wherein the inputs in the sample are from a control system and the outputs in the sample are sensor readings of the time-varying system;
generating, using the higher frequency processing loop comprising a plurality of filters, the sample of the inputs and the outputs, prior system parameters estimates of the time-varying system, and prior system state estimates of the time-varying system, a multi-dimensional hypersurface corresponding to the sample;
generating, using a lower frequency processing loop comprising a state and parameter estimator and the multi-dimensional hypersurface corresponding to the sample, a filtered system parameters estimate and a filtered system state estimate of the time-varying system; and
dynamically updating the control system with the filtered system parameters estimate and the filtered system state estimate of the time-varying system;
generating, using the control system, the filtered system parameters estimate, and the filtered system state estimate of the time-varying system, a control response associated with updated inputs to the time-varying system; and
controlling, by the control system, the time-varying system using on the control response.

13. The system of claim 12, wherein the one or more hardware processors are further configured to perform operations comprising:
updating the higher frequency processing loop with the filtered system parameters estimate and the filtered system state estimate of the time-varying-system for a subsequent iteration of the higher frequency processing loop, wherein the filtered system parameters estimate and the filtered system state estimate of the time-varying system are prior system parameters estimates and prior system state estimates of the time-varying system for the subsequent iteration, and
wherein the subsequent iteration of the higher frequency processing loop generates an updated multi-dimensional hypersurface corresponding to a new sample of inputs and outputs.

14. The system of claim 12, wherein each filter in the plurality of filters in the higher frequency processing loop adapts a subset of the estimated system parameters from the prior estimated system parameters, wherein each subset of the estimated system parameters is different for the each filter, and wherein other prior estimated system parameters from the prior estimated system parameters not in the subset of the estimated system parameters for each filter are held constant at the each filter as the each filter determines time series objects for the multi-dimensional hypersurface, wherein the size of each subset of the estimated system parameters must be less than or equal to the size of a predicted system output generated by each filter.

15. The system of claim 12, wherein the one or more hardware processors are further configured to perform operations comprising:
wherein the multi-dimensional hypersurface comprises time series objects aggregated from the plurality of filters, wherein each time series object in the time series objects comprises one or more of sequence of prediction errors, sequence of filtered estimated system parameters, sequence of filtered estimated system states, gradients of an output prediction-error cost function, signal-to-noise ratio formulations of the gradients, and sequence of system outputs.

16. The system of claim 12, wherein the one or more hardware processors are further configured to perform operations comprising:
generating, using at least one neural network in a filter in the plurality of filters, the inputs in the sample, prior system parameters estimates, and at least one of the prior system state estimates, prior system predicted outputs, or prior system outputs of the time-varying system, a predicted system output;
determining an error based on a difference between the predicted system output and the outputs in the sample;
generating an updated filtered estimated system parameter based on the error; and
generating, using the at least one neural network, the updated filtered estimated system parameter, the inputs in the sample, and a prior filtered estimated system state or prior system output, a subsequent filtered estimated system state or subsequent predicted system output.

17. The system of claim 16, wherein the one or more hardware processors are further configured to perform operations comprising:
generating, using the at least one neural network in the filter, the inputs in the sample, the subsequent filtered estimated system state or subsequent predicted system output, and the updated filtered system parameter, a second predicted system output;
determining a second error based on a difference between the second predicted system output and the outputs in the sample; and
generating, by the filter, a second updated filtered estimated system parameter based on the error.

18. The system of claim 12, wherein the one or more hardware processors are further configured to perform operations comprising:
- receiving, at a parameter estimator of the state and parameter estimator, the multi-dimensional hypersurface corresponding to the sample;
- generating, at the parameter estimator and using the hypersurface, prior filtered system parameters estimate, and at least one of prior filtered system state estimates or prior system output, the filtered system parameters estimate of the time-varying system; and
- generating, at a state filter of the state and parameter estimator and using at least one of the inputs in the sample, the filtered system parameters estimate, or the prior filtered system state estimates, and the prior system output, the filtered system state estimate of the time-varying system or a predicted system output.

19. The system of claim 18, wherein the one or more hardware processors are further configured to perform operations comprising:
- sampling a subset of time-series objects in the multi-dimensional hypersurface; and
- wherein the generating the filtered system parameters estimate is based on the subset of time-series objects.

20. A non-transitory machine-readable medium having stored thereon machine-readable instructions executable to cause a machine to perform operations comprising:
- receiving, at a high-frequency processing loop, a sample of inputs and outputs generated by a complex dynamical non-linear time-varying system, wherein the complex dynamical non-linear time-varying system comprises a plurality of time-varying parameters and states, wherein the plurality of the time-varying parameters and states comprise one or more of physical features, operating regimes, environmental disturbances, unknown control inputs, stochastic influences, and temporal dynamics, and wherein the inputs in the sample are from a control system and the outputs in the sample are sensor readings of the complex dynamical non-linear time-varying system;
- generating, in real-time and using a higher frequency processing loop comprising a plurality of filters, the sample of the inputs and the outputs, prior system parameters estimates of the complex dynamical non-linear time-varying system, and prior system state estimates of the complex dynamical non-linear time-varying system, a multi-dimensional hypersurface corresponding to the sample;
- generating, in real-time and using a lower frequency processing loop comprising a state and parameter estimator and the multi-dimensional hypersurface corresponding to the sample, a filtered system parameters estimate and a filtered system state estimate of the complex dynamical non-linear time-varying system; and
- dynamically updating the control system with the filtered system parameters estimate and the filtered system state estimate of the complex dynamical non-linear time-varying system to the control system, wherein the filtered system parameters estimate and the filtered system state estimate represent the plurality of time-varying parameters and states;
- receiving, from the control system a control response generated based on the filtered system parameters estimate and the filtered system state estimate of the complex dynamical non-linear time-varying system; and
- controlling the complex dynamical non-linear time-varying system using the control response.

21. The non-transitory machine-readable medium of claim 20, wherein the plurality of time-varying parameters and states interact in a manner that renders the control system under-constrained or unsuitable for linear state-space representations.

* * * * *